US011991079B2

(12) United States Patent
Vangala et al.

(10) Patent No.: US 11,991,079 B2
(45) Date of Patent: May 21, 2024

(54) METRICS FOR FAIRNESS AND LATENCY ASSURANCE IN IAB NETWORKS

(71) Applicant: APPLE INC., Cupertino, CA (US)

(72) Inventors: Sarma V. Vangala, Cupertino, CA (US); Dawei Zhang, Cupertino, CA (US); Fangli Xu, Beijing (CN); Haijing Hu, Cupertino, CA (US); Murtaza A. Shikari, Cupertino, CA (US); Ralf Rossbach, Bavaria-Bayern (DE)

(73) Assignee: APPLE INC., Cupertino, CA (US)

( * ) Notice: Subject to any disclaimer, the term of this patent is extended or adjusted under 35 U.S.C. 154(b) by 258 days.

(21) Appl. No.: 17/593,693

(22) PCT Filed: Jan. 14, 2021

(86) PCT No.: PCT/CN2021/071870
§ 371 (c)(1),
(2) Date: Sep. 22, 2021

(87) PCT Pub. No.: WO2022/151220
PCT Pub. Date: Jul. 21, 2022

(65) Prior Publication Data
US 2023/0179518 A1 Jun. 8, 2023

(51) Int. Cl.
*H04L 45/00* (2022.01)
*H04W 40/22* (2009.01)

(52) U.S. Cl.
CPC .............. *H04L 45/70* (2013.01); *H04L 45/38* (2013.01); *H04W 40/22* (2013.01)

(58) Field of Classification Search
None
See application file for complete search history.

(56) References Cited

U.S. PATENT DOCUMENTS

2021/0051105 A1\* 2/2021 Halepovic ............... H04L 43/16
2021/0243672 A1\* 8/2021 Deshmukh .......... H04W 40/248
(Continued)

FOREIGN PATENT DOCUMENTS

CN 110536352 A 12/2019
CN 110809293 \* 2/2020
(Continued)

OTHER PUBLICATIONS

PCT/CN2021/071870, International Search Report and Written Opinion, dated Oct. 15, 2021, 9 pages.

*Primary Examiner* — Moustafa M Meky
*Assistant Examiner* — Mohammad Yousuf A. Mian
(74) *Attorney, Agent, or Firm* — Dorsey & Whitney LLP

(57) ABSTRACT

Systems and methods for implementing various metrics for in integrated IAB networks are disclosed. A child IAB node may determine metrics regarding one or more of its data flows and report these metrics to an upstream IAB node (that is a parent node and/or an IAB donor). The upstream node may determine a data flow prioritization configuration using these metrics that it either uses itself or sends back to the child IAB node or another IAB node of the IAB network for use there. Metrics discussed include a number of hops metric, an aggregate throughput per BH RLC channel ID (or per routing ID) metric, a fairness index per BH RLC channel ID (or per routing ID) metric, a packet drop metric, and a per-hop latency for aggregated traffic per BH RLC channel ID (or per routing ID) per IAB node metric.

16 Claims, 20 Drawing Sheets

(56) References Cited

U.S. PATENT DOCUMENTS

| | | | | |
|---|---|---|---|---|
| 2021/0345369 A1* | 11/2021 | Teyeb | ............... | H04W 28/0278 |
| 2022/0141058 A1* | 5/2022 | Liu | ....................... | H04W 76/14 |
| | | | | 370/329 |
| 2022/0377611 A1* | 11/2022 | Faronius | ........... | H04W 28/0861 |
| 2023/0189045 A1* | 6/2023 | Chen | .................... | H04W 24/10 |
| | | | | 370/252 |
| 2023/0232285 A1* | 7/2023 | Barac | ................ | H04W 36/0009 |
| | | | | 370/331 |

FOREIGN PATENT DOCUMENTS

| | | | |
|---|---|---|---|
| CN | 110809293 A | | 2/2020 |
| CN | 114390593 A | * | 4/2022 |
| WO | 2019216670 A1 | | 11/2019 |

* cited by examiner

| Bit | Description |
| --- | --- |
| 0 | Flow control feedback per BH RLC channel |
| 1 | Flow control feedback per BAP routing ID |
| 10 | Flow control feedback polling |
| 11 | BH RLF indication |
| 100 | Hop Count |
| 101 | Aggregate throughput per BH RLC Channel ID |
| 110 | Aggregate throughput per routing ID |
| 111 | Fairness Index per BH RLC Channel ID |
| 1000 | Fairness Index per Routing ID |
| 1001 | Purposeful Packet Drop |
| 1010 | Per hop latency per BH RLC Channel ID |
| 1011 | Per hop latency per Routing ID |
| 1100-1111 | Reserved |

FIG. 4

| D/C | PDU Type | R | R | R | Oct 1 |
|---|---|---|---|---|---|
| BH RLC Channel ID ||||| Oct 2 |
| BH RLC Channel ID (cont.) ||||| Oct 3 |
| Aggregate Throughput ||||| Oct 4 |
| Aggregate Throughput (cont.) ||||| Oct 5 |
| Aggregate Throughput (cont.) ||||| Oct 6 |
| BH RLC Channel ID ||||| Oct 7 |
| BH RLC Channel ID (cont.) ||||| Oct 8 |
| Aggregate Throughput ||||| Oct 9 |
| Aggregate Throughput (cont.) ||||| Oct 10 |
| Aggregate Throughput (cont.) ||||| Oct 11 |

| D/C | PDU Type | R | R | R | Oct 1 |
| BH RLC Channel ID | | | | | Oct 2 |
| BH RLC Channel ID (cont.) | | | | | Oct 3 |
| R | R | Fairness Index | | | Oct 4 |
| BH RLC Channel ID | | | | | Oct 5 |
| BH RLC Channel ID (cont.) | | | | | Oct 6 |
| R | R | Fairness Index | | | Oct 7 |

FIG. 8

| | | | | | | | |
|---|---|---|---|---|---|---|---|
| D/C | PDU Type | | R | R | R | Oct 1 | |
| Destination (to report) | | | | | | Oct 2 | |
| Destination (cont.) | SN – Start | | | | | Oct 3 | |
| SN – Start (cont.) | | | | | | Oct 4 | |
| SN – End | SN – Start (cont.) | | | | | Oct 5 | |
| SN – End (cont.) | | | | | | Oct 6 | |
| R | R | R | R | SN – End (cont.) | | Oct 7 | |
| SO – Start | | | | | | Oct 8 | |
| SO – Start (cont.) | | | | | | Oct 9 | |
| SO – End | | | | | | Oct 10 | |
| SO – End (cont.) | | | | | | Oct 11 | |
| BH RLC Channel ID | | | | | | Oct 12 | |
| BH RLC Channel ID (cont.) | | | | | | Oct 13 | |

...

FIG. 10

# METRICS FOR FAIRNESS AND LATENCY ASSURANCE IN IAB NETWORKS

TECHNICAL FIELD

This application relates generally to wireless communication systems, including wireless communication systems implementing various metrics for use in integrated access and backhaul (IAB) networks.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates a chart having new protocol data unit (PDU) type IDs for use in backhaul adaptation protocol (BAP) messages that may be used to send one of these metrics, according to an embodiment.

FIG. 6 illustrates an aggregate throughput per backhaul (BH) radio link control (RLC) channel ID BAP control PDU for transporting an aggregate throughput per BH RLC channel ID metric, according to an embodiment.

FIG. 8 illustrates a fairness index per BH RLC channel ID BAP control PDU for transporting a fairness index per BH RLC channel ID metric, according to an embodiment.

FIG. 10 illustrates a fairness index per routing ID packet drop BAP control PDU for transporting a packet drop metric, according to an embodiment.

DETAILED DESCRIPTION

A millimeter wave (mmwave) deployment of a wireless network may use fiber backhaul in order to carry traffic at NR speeds. It may be difficult or expensive, however, to provide fiber backhaul for the many nodes used for mmwave coverage. In certain systems, integrated access and backhaul (TAB) may be used to overcome deployment costs of ultradense NR mmWave networks by realizing wireless backhaul links to relay the access traffic.

TAB architectures enable multi-hop routing wherein IAB nodes serve as both access nodes to UEs and provide backhaul (BH) links to other IAB nodes. On the wireless backhaul, the IP layer is carried over the backhaul adaptation protocol (BAP) sublayer, which enables routing over multiple hops. The BAP allows for the IAB nodes to talk to each other and provides for a number of functionalities which include, for example, mapping of next hop radio link control (RLC) channels, routing to next hop IAB nodes (both child and parent) based on traffic differentiation, indication of network events (e.g., radio link failure (RLF)), data transfer, and/or flow control feedback signaling.

On each backhaul link, the BAP protocol data units (PDUs) are carried by BH RLC channels. Multiple BH RLC channels can be configured on each BH link to allow traffic prioritization and quality of service (QoS) enforcement. The BH-RLC-channel mapping for BAP PDUs is performed by the BAP entities on each IAB node and the IAB donor data unit (DU). In certain systems, RLC channel mapping may be done through a radio resource control (RRC) reconfiguration message from the donor control unit (CU) to each of the individual nodes. In some implementations of BH RLC channel establishment, separate RRC reconfiguration messages are used to ensure that the setup is done hop by hop until the final destination (at the UE).

Figure 1:
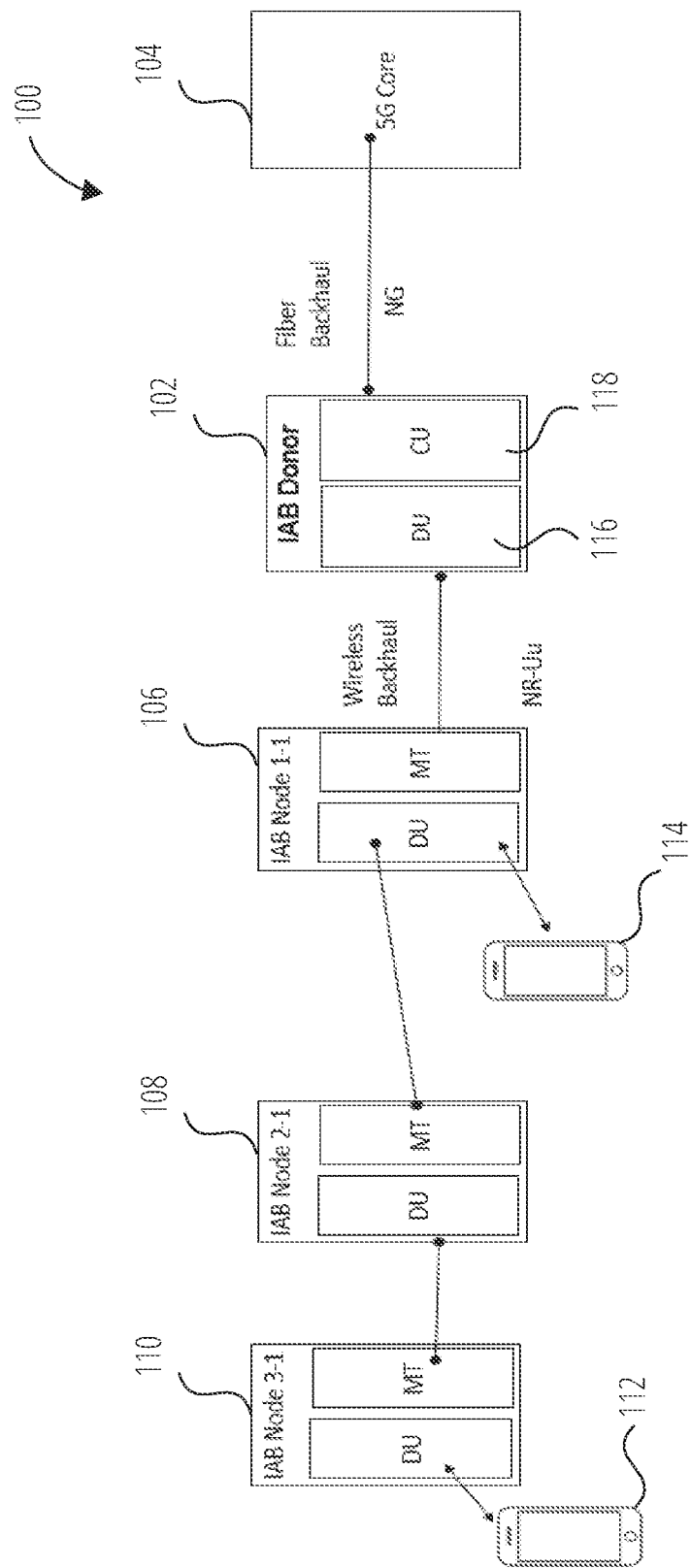
FIG. 1 illustrates an example integrated access and backhaul (IAB) network for certain embodiments.

FIG. 1 illustrates an example IAB network 100 for certain embodiments. The IAB network 100 includes an IAB donor 102 with a fiber backhaul connection (e.g., through an NG interface) to a 5G core network (5GC) 104. In this example, the IAB network 100 also an IAB node 106 (shown as IAB Node 1-1), an IAB node 108 (shown as IAB Node 2-1), and an IAB node 110 (shown as IAB Node 3-1), although any number of IAB nodes or hops may be used to establish a connection between a UE 112 and the 5GC 104. The IAB node 110 establishes communication between the UE 112 and the 5GC 104 using a wireless backhaul (e.g., using an NR-Uu interface). Skilled persons will recognize from the disclosure herein that any of the JAB nodes may also provide communication other UEs. For example, the IAB node 106 may establish communication between a UE 114 and the 5GC 104. It is contemplated that an IAB donor may also be properly considered, in at least some situations, as an JAB node as that term is used herein (e.g., in the context of its relationship to its direct child IAB nodes).

The IAB donor 102, which may also be referred to as a backend node, comprises a DU 116 and a CU 118. Although shown as a single unit, the DU 116 of the IAB donor 102 may comprise two or more DUs. The IAB node 106, JAB node 108, and IAB node 110 may be referred to as intermediate nodes, child nodes or relay nodes and each includes two sub-components: a DU and a mobile terminal (MT). A CU typically provides for the basic control plane functionality. In certain embodiments, a CU includes CU-control plane (CU-CP), CU-user plane (CU-UP), and/or other functionality.

An MT comprises components that configure a network node (e.g., gNB) to behave similar to a regular UE. For example, protocols that typical UEs use to connect to the network are supported in the MT with additional enhancements discussed in 3GPP Rel. 16 and Rel.17. For example, an MT in the TAB node 108 allows the TAB node 108 to establish signaling radio bearers (SRBs) and/or data radio bearers (DRBs) with its parent node (the TAB node 106). An MT performs cell selection to identify which parent to join and sets up and utilizes RLC through the BAP layer that provides functionality for routing data for different UE bearers over different routes through the network.

Figure 2:
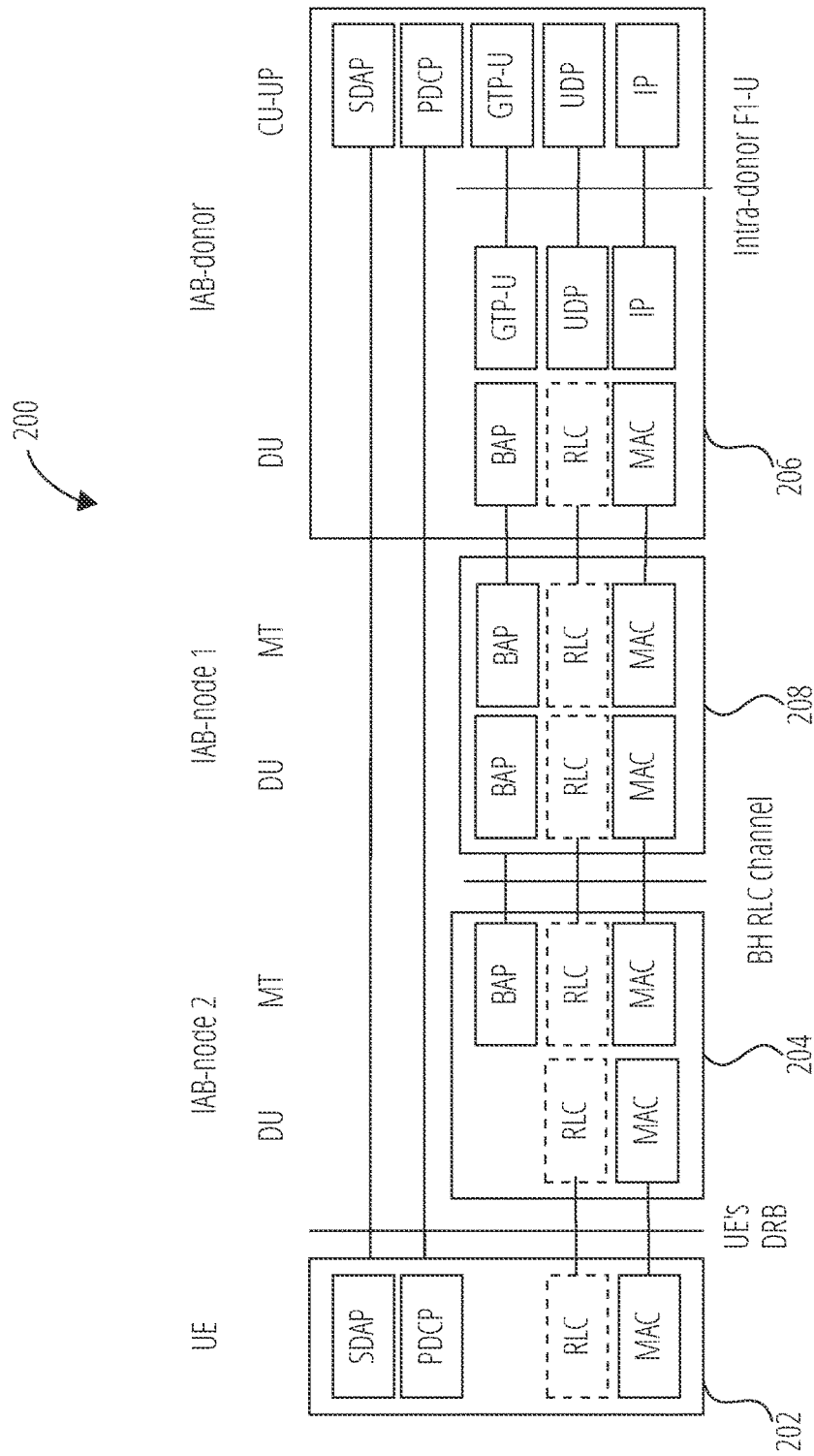
FIG. 2 illustrates an example protocol architecture for IAB according to one embodiment.

FIG. 2 illustrates an example protocol architecture for TAB 200 according to one embodiment. The example protocol architecture for TAB 200 shows various protocol layers for a UE 202, a first TAB node 208 (IAB-node 1), a second TAB node 204 (TAB-node 2), and an IAB donor 206. The various layers may correspond to mobile terminated (MT), distributed unit (DU), or centralized unit (CU)-user plane (UP) entities. The DU and CU-UP of the IAB donor 206 may communicate through an intra-donor F1-U interface. In this example, the UE 202 wirelessly communicates with the second TAB node 204 through the UE's dedicated radio bearer (DRB), and the second IAB node 204 wirelessly relays the uplink traffic to the first IAB node 208 through a backhaul (BH) radio link control (RLC) channel. The protocol layers include, for example, medium access control (MAC), RLC, packet data convergence protocol (PDCP), service data adaptation protocol (SDAP), internet protocol (IP), user datagram protocol (UDP), and general packet radio service (GPRS) tunneling protocol user plane (GTP-U).

The example protocol architecture for TAB 200 also includes a backhaul adaptation protocol (BAP) layer that provides functionality for routing data for different UE bearers over different routes through the network. This may be done by having an adaptation layer header that includes some information to identify a bearer. The routing includes mapping incoming data to an outgoing link based on the bearer identifier.

Given that different UE bearers can be carried on different routes through the network, in certain embodiments, the buffer occupancy status generated by a node may be relevant only to bearers that are routed through that node and the TAB nodes on those routes.

A data flow may include one or more BAP PDUs having a same BH RLC channel ID and sent on a BH link between a first and a second entity over time. In some embodiments, it is contemplated that an IAB node may consolidate or merge multiple incoming data flows into a single outgoing data flow.

One consideration when developing wireless communication systems using IAB is that of fairness among various data flows. In an IAB topology, some UEs are further from an IAB donor/5GC than other UEs (see, for example, FIG. 1, where the UE 112 is more hops away from the IAB donor 102/5GC 104 than the UE 114). Accordingly, mechanisms for ensuring that the UE 112 may receive a QoS treatment for one or more of its data flows that is similar (in effect) to the QoS treatment it would receive if it were connected to, for example, a gNB of the wireless communication system (without going through the IAB network 100) may be desirable. Further, mechanisms to prevent the data flows of the UE 114 to be unfairly favored relative to the data flows of the UE 112 due to the closer proximity (in hop distance) of the UE 114 to the IAB donor 102/5GC 104 are also of interest.

Another aspect of fairness throughout an TAB network may be the prevention of starvation of best effort (BE) PDU flows relative to any QoS PDU flows in the IAB network. It may also be valuable to have a mechanism to ensure that a BE UE/data flow that is closer to the IAB donor is not penalized in order to maintain QoS requirements of another UE/data flow that is perhaps further away (in hop count) from the IAB donor.

Another aspect of fairness throughout an IAB network may be to ensure that QoS requirements of two UEs can be maintained in the case where each UE has joined the IAB network via different IAB nodes and has same/similar signaling conditions, irrespective of the number of hops of either of the UEs from the IAB donor.

Another aspect of fairness throughout an IAB network may be to ensure that a weighted fair queuing mechanism is used to distribute grants to various IAB nodes is based on data transfer requirements of the various flows within the IAB network, rather than on parent-child node dynamics as between IAB nodes of the IAB network.

It is contemplated that possible solutions to meet these considerations might impact at least three areas. First, any adaptive routing functionality within the IAB network may be implicated by controlling for any of these aspects. In other words, the ability of the IAB network to re-route a data flow due to, for example, congestion and/or signaling conditions may be impacted.

Second, any local metric computation and evaluation functionality allowing for better reactive decision making at the non-centralized controller may be implicated by controlling for these aspects. This may include, for example, determinations related to latency, fairness, and/or congestion. These local calculations may be more or less used depending on the nature of the solution chosen. Such a local calculation may result in a data flow prioritization at the local node (e.g., the TAB node that is not necessarily the IAB donor) that is then sent to its child TAB node.

Third, any centralized decision making functionality within the TAB network may be implicated by controlling for any of these aspects. Any solution controlling for the above-discussed aspect may rely on more or less centralized decision making (e.g., from an IAB donor to an IAB node) functionality within the IAB network.

It may be that a solution chosen does not provide undue advantages to UEs above that which they would enjoy in the case of a single hop network. Further, it may be that a solution chosen is geared to ensure that a UE that is more proximate to a IAB donor than a second UE will not be unduly penalized in order to provide a certain level of service to the second UE.

It may be that one or more metrics may be used within an TAB network in order to develop solutions as discussed herein. These metrics may allow for an TAB node or CU that receives such metrics to ensure one or more of fairness goals, latency goals, and/or congestion reduction goals are met.

Current metrics available (prior to the introduction of those discussed herein) within wireless communication systems may be currently present per gNB. Accordingly, the wireless communication system should be adapted to use metrics at individual IAB nodes (which may currently be treated using UE procedures). Further, current metrics may be on a per DRB, per UE basis, which is unsuitable for many-to-one (N:1) BH RLC mapping usage at an individual TAB. Load, latency, and packet loss may all be present including random access channel (RACH) level metrics, so it may be highly useful to use a similar framework in an inclusive way. Further, it may be that such current metrics can only be communicated to and/or by an IAB donor to an IAB node.

Accordingly, additional metrics proposed herein may involve metrics related to QoS and/or packet delay budget (PDB) management at intermediate TAB nodes, in order to address issues introduced due to the potential multi-hopping issues related to the use of an IAB network.

An TAB node may determine one or more metrics according to its data flows. Further, these metrics may then be communicated to a parent IAB node in, e.g., a BAP layer communication, so that the parent IAB node is enabled to take action to ensure fairness/latency/congestion goals are met as to those flows. In some cases, the parent TAB node may determine a data flow prioritization configuration using these metrics (either for itself or for the child TAB node, in which latter case it may send the data flow prioritization configuration to the child TAB node).

Alternatively or additionally, these metrics may be communicated to a CU of an IAB donor in either an F1AP communication or subsequent BAP layer communication(s), so that the IAB donor is enabled to take action to ensure fairness/latency/congestion goals are met as to those flows. In some cases, the IAB donor may determine a data flow prioritization configuration using these metrics (either for itself, or for the descendent TAB node or another TAB node in the TAB network, in which latter case it may send the data flow prioritization configuration to the relevant TAB node).

Figure 3:
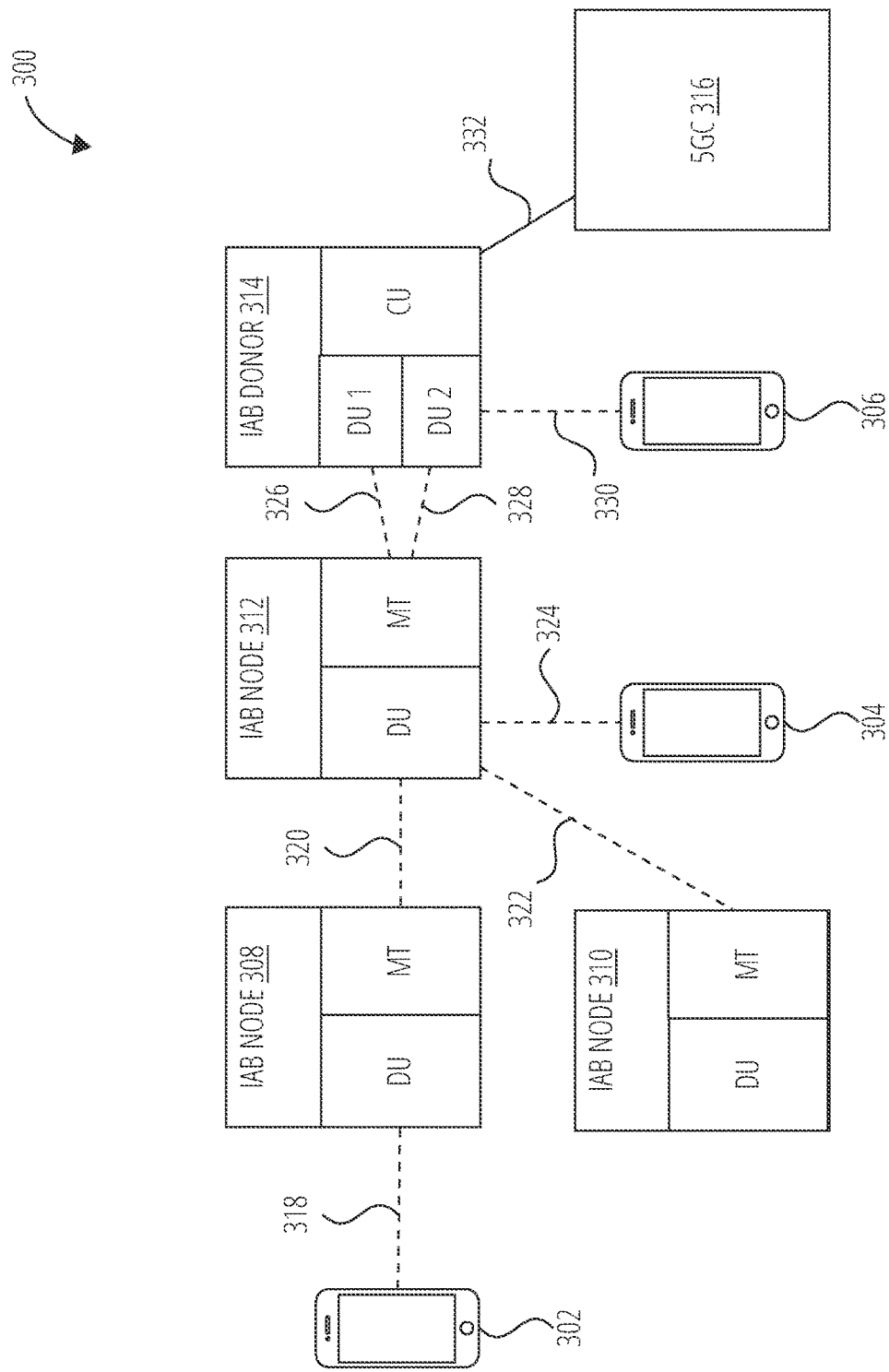
FIG. 3 illustrates an IAB network, according to some embodiments.

FIG. 3 illustrates an TAB network 300, according to some embodiments. The TAB network 300 includes a first UE 302, a second UE 304, and a third UE 306, a first TAB node 308, a second TAB node 310, and a third TAB node 312, an IAB donor 314, and a 5GC 316. The first UE 302 connects to the first IAB node 308 on a first BH link 318. The first IAB node 308 connects to the third IAB node 312 on a second BH link 320. The second TAB node 310 connects to the third IAB node 312 on a third BH link 322. The second UE 304 connects to the third IAB node 312 on a fourth BH link 324. The third IAB node 312 connects to the IAB donor 314 on one or both of a fifth BH link 326 and/or a sixth BH link 328. The third UE 306 connects to the IAB donor 314 on a seventh BH link 330. Finally, the IAB donor 314 connects to the 5GC 316 on a fiber BH 332. It is contemplated that IAB nodes of FIG. 3 may communicate data flows between each other using one-to-one (1:1) RLC channel mapping, or they may communicate data flows between each other using N:1 RLC channel mapping.

The IAB network 300 can be used to illustrate multiple potential problems that can be solved by the introduction of the use of various new metrics into the IAB network 300. These problems may lead an IAB system to be unfair in providing services across all users in the manner described above. These problems may result in an inability to guarantee that an end-to-end (E2E) latency requirement of a UE outgoing data flow due to the multi-hop nature of an TAB network.

In a first instance, it may be that an IAB node (e.g., the third IAB node 312) does not have all the needed centralized information of the system to make appropriate decisions regarding its incoming data flows. These may include, for example, a number of hops to a destination, how many QoS UEs/data flows are aggregated into the incoming data flow, and how many BE UEs/data flows are aggregated into the incoming data flow, an aggregate BH RLC channel rate, etc. Because it lacks this information, the third IAB node 312 may not be able to recognize that it should, for example, prioritize an incoming data flow because it has a larger number of hops to the destination, prioritize an incoming data flow from the first IAB node 308 that aggregates many UE VoIP data flows over the single VoIP incoming data flow from second UE 304 such that equal treatment of all UE VoIP data flows is achieved, etc. All of this centralized information may instead be at the CU of the IAB donor 314, which in any case may not have the most accurate information about downstream nodes such as the children of the third IAB node 312 (the first IAB node 308 and the second IAB node 310).

In a second instance, it may be that an IAB node (e.g., the third IAB node 312) does not include a prioritization scheme to prioritize packets which are incurring extra latency and/or violate a PDB, such that a QoS of the data flow cannot be met. Because it lacks this ability, such packets may not be prioritized relative to others to allow the QoS to be met. In some cases, this may mean that the third IAB node 312 does not have a prioritization scheme to prioritize, for example, traffic corresponding to a larger hop distance over other traffic.

In a third instance, it may be that an IAB node (e.g., the third IAB node 312) does not have a mechanism to request additional resources for BH RLC flows that have to carry a relatively larger number of aggregated individual UE data flows. This can occur in cases where, for example, child IAB nodes do not have balanced usage (e.g., where the first IAB node 308 is located in an office and thus sees high traffic during business hours, and the second IAB node 310 is located in a residential area and thus sees relatively lower traffic during business hours).

In a fourth instance, it may be that an IAB node (e.g., the third IAB node 312) does not have residual PDB information for a current packet flow. In other words, there is no information that would allow the third IAB node 312 to recognize that adjustments should be made in order to maintain the QoS of a current data flow. The third IAB node 312 may also be unaware in this case of the latency to the IAB donor 314, which might help the third IAB node 312 to ensure that a packet can be delivered with any/some residual PDB remaining.

In a fifth instance, it may be that an IAB node (e.g., the third IAB node 312) does not have a way to reduce buffer overloads on traffic that might be causing additional latency pile ups, nor does it have mechanisms to clean up flows that potentially cannot meet a required QoS (e.g., a required latency and/or PDB criteria). In other words, there are no packet discard mechanisms at the third IAB node 312. This may mean that packets that will likely be dropped at an upstream entity of the IAB network continue to be sent by the third IAB node 312 to the IAB donor 314 (in spite of this likelihood), where it may be preferable to drop such packets at the third IAB node 312 in order to conserve those transmission resources. Further, there are no mechanisms to report individual buffer status to the CU in cases of overload on some logical channels (LCHs) over others.

The addition of various metrics to be used in an IAB network may allow the above problems to be resolved. These metrics may include: a number of hops metric, an aggregate throughput per BH RLC channel ID metric, an aggregate throughput per routing ID metric, a fairness index per BH RLC channel TD metric, a fairness index per routing ID metric, a packet drop metric, a per-hop latency for aggregated traffic per BH RLC channel ID per TAB node metric, and a per-hop latency for aggregated traffic per routing ID per IAB node metric.

As previously discussed, it is contemplated that one or more of these metrics may be sent to a parent IAB from an IAB node/received at an IAB node from a parent IAB node (as appropriate) using a BAP PDU signaling. In some embodiments, the receiving IAB node may use the information found in the received metric directly, and/or the information may then be further relayed through additional BAP signaling to the IAB donor. It is also contemplated that one or more of these metrics may instead be sent to/received from an IAB donor directly using an F1AP interface between an IAB node and the IAB donor. The use of the F1AP in this manner may be more centralized than the use BAP signaling, in that the IAB donor will be used to receive and relay all such messages from their source IAB nodes to their destination IAB nodes.

FIG. 4 illustrates a chart 400 having new PDU type IDs for use in BAP messages that may be used to send one of these metrics, according to an embodiment. The PDU type IDs may be represented in binary as they would be placed in a BAP PDU, as will be described. As illustrated, a number of hops metric (Hop Count) may correspond to a number of hops BAP control PDU that uses a PDU type ID of 100. An aggregate throughput per BH RLC channel ID metric may correspond to an aggregate throughput per BH RLC channel ID BAP control PDU that uses a PDU type ID of 101. An aggregate throughput per routing ID metric may correspond to an aggregate throughput per routing ID BAP control PDU that uses a PDU type ID of 110. A fairness index per BH RLC channel ID metric may correspond to a fairness index per BH RLC channel ID BAP control PDU that uses a PDU type ID of 111. A fairness index per routing ID metric may correspond to a fairness index per routing ID BAP control PDU that uses a PDU type ID of 1000. A packet drop metric (Purposeful Packet Drop) may correspond to a packet drop BAP control PDU that uses a PDU type ID of 1001. A per-hop latency for aggregated traffic per BH RLC channel ID per TAB node metric may correspond to a per-hop latency for aggregated traffic per BH RLC channel ID per TAB node BAP control PDU that uses a PDU type ID of 1010. A per-hop latency for aggregated traffic per routing TD per TAB node metric may correspond to a per-hop latency for aggregated traffic per routing ID per TAB node BAP control PDU that uses a PDU type ID of 1011. PDU type IDs 1100-1111 may remain reserved.

A number of hops metric may be received which corresponds to one or more data flows at a downstream TAB node. A number of hops metric may provide an indirect way to estimate latency and/or provide UEs with prioritization information from the CU of the IAB donor as needed. Implementation of this metric may be based on a counter mechanism which gets incremented every time a new hop is reached (e.g., every time a new TAB node is reached). The counter may stop incrementing once it reaches the IAB donor.

The integer increase on the hop count may be validated. This may involve converting a BAP message to an acknowledgement based mechanism or by introducing timestamping to BAP headers.

Figure 5:
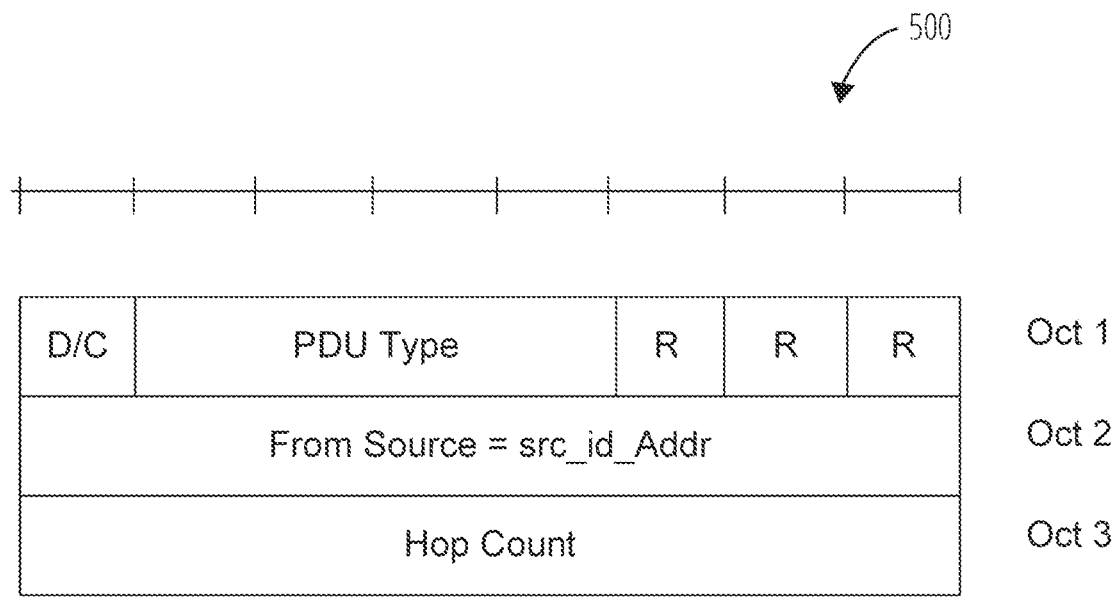
FIG. 5 illustrates a number of hops BAP control PDU for transporting a number of hops metric, according to an embodiment.

FIG. 5 illustrates a number of hops BAP control PDU 500 for transporting a number of hops metric, according to an embodiment. As illustrated, the number of hops BAP control PDU 500 includes a D/C bit, which acts to indicate whether the number of hops BAP control PDU 500 is a control PDU or a data PDU (in some cases, for the control PDU, the D/C bit may be set to 0 for control).

The number of hops BAP control PDU 500 further includes the PDU Type field. The appropriate PDU type ID for the number of hops BAP control PDU 500 (100) may be inserted into this field.

The number of hops BAP control PDU 500 further includes the source field, that provides a source address for corresponding to the number of hops BAP control PDU 500.

The number of hops BAP control PDU 500 further includes the hop count field, which carries the current hop count to the parent IAB node.

As illustrated, the number of hops BAP control PDU 500 further includes various reserved bits (marked "R"). This may help promote octet alignment within the number of hops BAP control PDU 500 among the various data fields, in the manner shown. In some embodiments, a number of hops BAP control PDU is sent without the reserved bits (and the various data fields are adjusted to fit be adjacent by ignoring any octet alignment considerations). In these embodiments, such a number of hops BAP control PDU may use less resources (bits) than the number of hops BAP control PDU 500.

An aggregate throughput per BH RLC channel ID metric and/or an aggregate throughput per routing ID metric may be received which corresponds to one or more data flows at a downstream IAB node. An aggregate throughput per BH RLC channel ID metric or an aggregate throughput per routing ID metric may allow for a CU of an IAB donor to know the amount of traffic being carried by each IAB node. It may also allow for an IAB node receiving such a metric to come up with solutions to itself readjust prioritizations of flows based on grant availability to child IAB nodes, rather than solely relying on recommendations a CU of an IAB donor. This may promote a more reactive IAB network.

In these cases, to track across IAB nodes where data flow aggregation is occurring, it may be helpful to also have 5G QoS Identifier (5QI) information available (e.g., in the scenario where a number of UEs are in a far cell condition corresponding to the relevant BH RLC flows).

Implementation of an aggregate throughput per BH RLC channel ID metric or an aggregate throughput per routing ID metric may involve calculating the number of RLC service data units (SDU) bytes transmitted divided by a number of acknowledgments corresponding to those RLC SDUs (per BH RLC channel ID or per routing ID, as appropriate).

FIG. 6 illustrates an aggregate throughput per BH RLC channel ID BAP control PDU 600 for transporting an aggregate throughput per BH RLC channel ID metric, according to an embodiment. As illustrated, the aggregate throughput per BH RLC channel ID BAP control PDU 600 includes a D/C bit, which acts to indicate whether the aggregate throughput per BH RLC channel ID BAP control PDU 600 is a control PDU or a data PDU (in some cases, for the control PDU, the D/C bit may be set to 0 for control).

The aggregate throughput per BH RLC channel ID BAP control PDU 600 further includes the PDU Type field. The appropriate PDU type ID for the aggegate throughput per BH RLC channel ID BAP control PDU 600 (101) may be inserted into this field.

The aggregate throughput per BH RLC channel ID BAP control PDU 600 further includes one or more BH RLC channel ID fields, which identify one or more BH RLC channels for which an aggregate throughput per BH RLC channel ID metric being sent relates.

The aggregate throughput per BH RLC channel ID BAP control PDU 600 further includes one or more aggregate throughput fields, which relate the aggregate throughput per BH RLC channel ID metric itself for a corresponding BH RLC channel ID, as illustrated.

As illustrated, the aggregate throughput per BH RLC channel ID BAP control PDU 600 further includes various reserved bits (marked "R"). This may help promote octet alignment within the aggregate throughput per BH RLC channel ID BAP control PDU 600 among the various data fields, in the manner shown. In some embodiments, an aggregate throughput per BH RLC channel ID BAP control PDU is sent without the reserved bits (and the various data fields are adjusted to fit be adjacent by ignoring any octet alignment considerations). In these embodiments, such an aggregate throughput per BH RLC channel ID BAP control PDU may use less resources (bits) than the aggregate throughput per BH RLC channel ID BAP control PDU 600.

Figure 7:
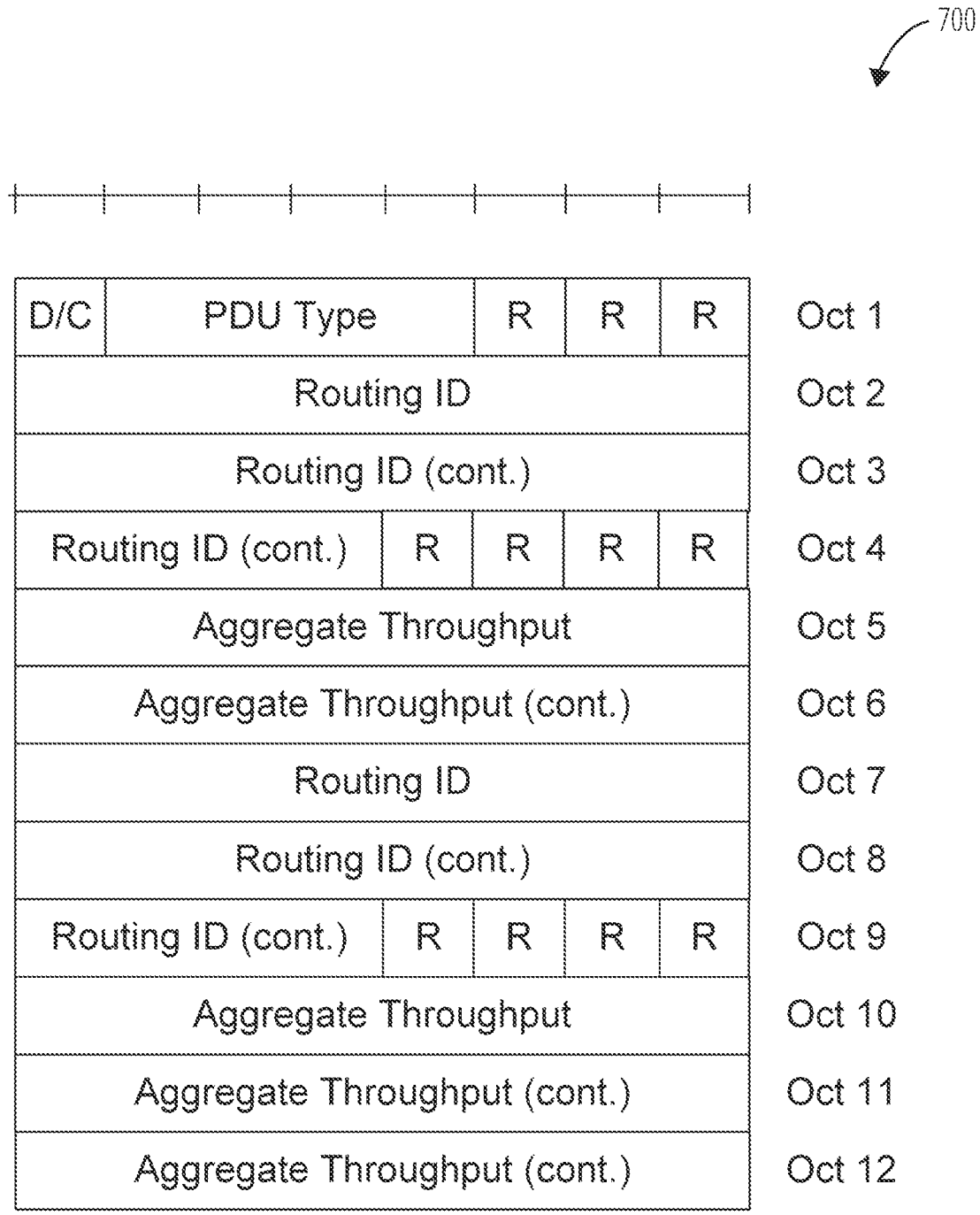
FIG. 7 illustrates an aggregate throughput per routing ID control PDU for transporting an aggregate throughput per routing ID metric, according to an embodiment.

FIG. 7 illustrates an aggregate throughput per routing ID BAP control PDU 700 for transporting an aggregate throughput per routing ID metric, according to an embodiment. As illustrated, the aggregate throughput per routing ID BAP control PDU 700 includes a D/C bit, which acts to indicate whether the aggregate throughput per routing ID BAP control PDU 700 is a control PDU or a data PDU (in some cases, for the control PDU, the D/C bit may be set to 0 for control).

The aggregate throughput per routing ID BAP control PDU 700 further includes the PDU Type field. The appropriate PDU type ID for the aggregate throughput per routing ID BAP control PDU 700 (110) may be inserted into this field.

The aggregate throughput per routing ID BAP control PDU 700 further includes one or more routing ID fields, which identify one or more routing IDs for which the aggregate throughput per routing ID metric is being sent.

The aggregate throughput per routing ID BAP control PDU 700 further includes one or more aggregate throughput fields, which relate the aggregate throughput per routing ID metric itself for a corresponding routing ID, as illustrated.

As illustrated, the aggregate throughput per routing ID BAP control PDU 700 further includes various reserved bits (marked "R"). This may help promote octet alignment within the aggregate throughput per routing ID BAP control PDU 700 among the various data fields, in the manner shown. In some embodiments, an aggregate throughput per routing ID BAP control PDU is sent without the reserved bits (and the various data fields are adjusted to fit be adjacent by ignoring any octet alignment considerations). In these embodiments, such an aggregate throughput per routing ID BAP control PDU may use less resources (bits) than the aggregate throughput per routing ID BAP control PDU 700.

A fairness index per BH RLC channel ID metric or a fairness index per routing ID metric may be calculated at a CU of an IAB donor. It may indicate to an TAB node with which an IAB donor communicates a percentage of time duration that the IAB node should allow packets of different LCIDs to flow from a global perspective.

The fairness index per BH RLC channel ID metric or fairness index per routing ID metric is calculated based on current rate conditions on the TAB node for various BH RLC channel IDs or various routing IDs, as appropriate. This index may be calculated using, for example, an aggregate throughput per BH RLC channel ID metric or an aggregate throughput per routing ID metric received at the CU of the IAB donor from the IAB node in question.

For an IAB node that has been configured by the CU with either type of fairness index, any changes to the pattern for the configured fairness index made by the IAB node should be reported back to the CU.

FIG. 8 illustrates a fairness index per BH RLC channel ID BAP control PDU 800 for transporting a fairness index per BH RLC channel ID metric, according to an embodiment. As illustrated, the fairness index per BH RLC channel ID BAP control PDU 800 includes a D/C bit, which acts to indicate whether the fairness index per BH RLC channel ID BAP control PDU 800 is a control PDU or a data PDU (in some cases, for the control PDU, the D/C bit may be set to 0 for control).

The fairness index per BH RLC channel ID BAP control PDU 800 further includes the PDU Type field. The appropriate PDU type ID for the fairness index per BH RLC channel ID BAP control PDU 800 (111) may be inserted into this field.

The fairness index per BH RLC channel ID BAP control PDU 800 further includes one or more BH RLC channel ID fields, which identify one or more BH RLC channels for which the fairness index per BH RLC channel ID metric is being sent.

The fairness index per BH RLC channel ID BAP control PDU 800 further includes one or more fairness index fields, which relate the fairness index per BH RLC channel ID metric itself for a corresponding BH RLC channel, as illustrated.

As illustrated, the fairness index per BH RLC channel ID BAP control PDU 800 further includes various reserved bits (marked "R"). This may help promote octet alignment within the aggregate fairness index per BH RLC channel ID BAP control PDU 800 among the various data fields, in the manner shown. In some embodiments, a fairness index per BH RLC channel ID BAP control PDU is sent without the reserved bits (and the various data fields are adjusted to fit be adjacent by ignoring any octet alignment considerations). In these embodiments, such a fairness index per BH RLC channel TD BAP control PDU may use less resources (bits) than the fairness index per BH RLC channel ID BAP control PDU 800.

Figure 9:
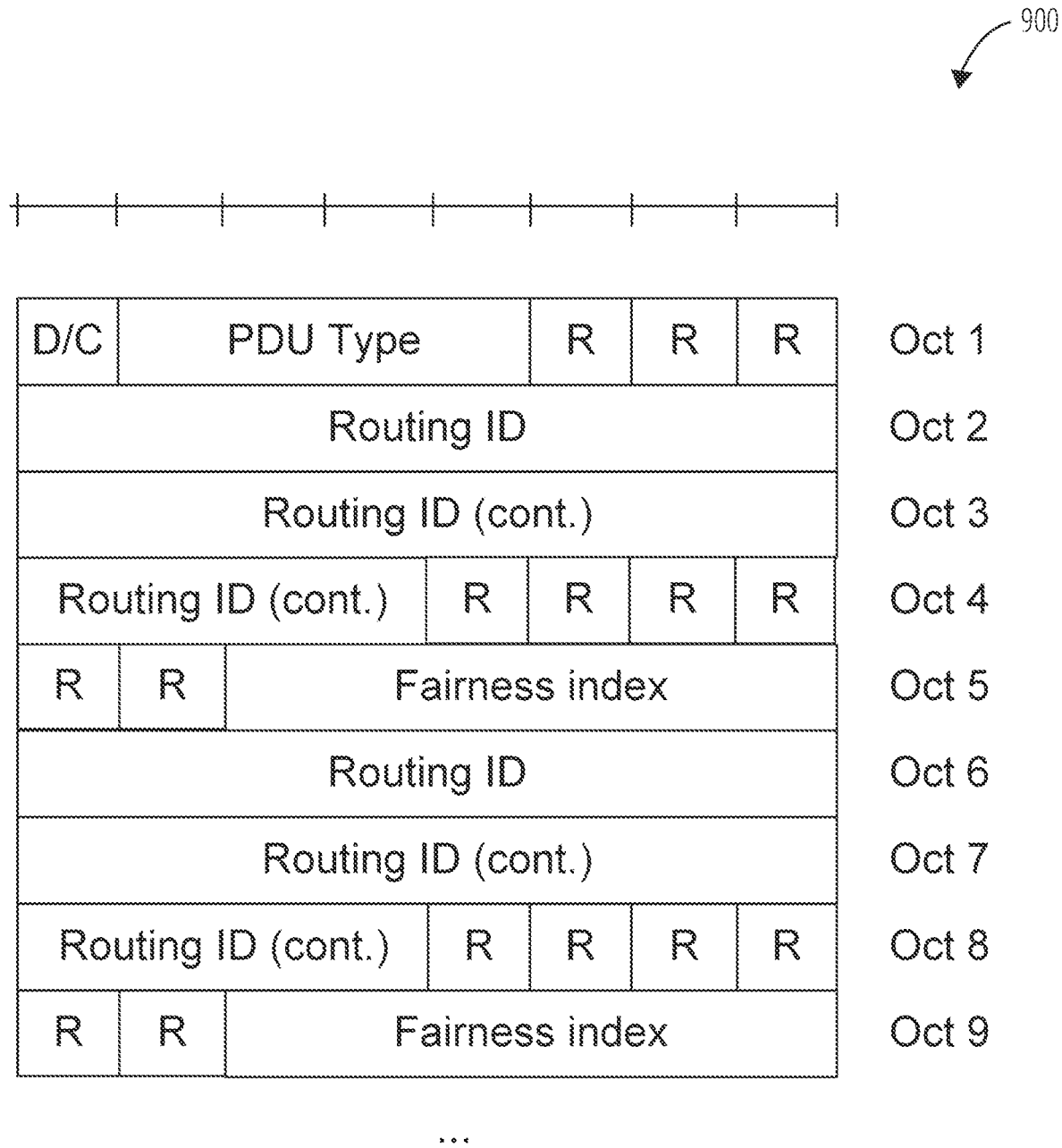
FIG. 9 illustrates a fairness index per routing 1D BAP control PDU for transporting a fairness index per routing ID metric, according to an embodiment.

FIG. 9 illustrates a fairness index per routing ID BAP control PDU 900 for transporting a fairness index per routing ID metric, according to an embodiment. As illustrated, the fairness index per routing ID BAP control PDU 900 includes a D/C bit, which acts to indicate whether the fairness index per routing ID BAP control PDU 900 is a control PDU or a data PDU (in some cases, for the control PDU, the D/C bit may be set to 0 for control).

The fairness index per routing ID BAP control PDU 900 further includes the PDU type field. The appropriate PDU type ID for the fairness index per routing ID BAP control PDU 900 (1000) may be inserted into this field.

The fairness index per routing ID BAP control PDU 900 further includes one or more routing ID fields, which identify one or more routing IDs for which the fairness index per routing ID metric is being sent.

The fairness index per routing ID BAP control PDU 900 further includes one or more fairness index fields, which relate the fairness index per routing ID metric itself for a corresponding routing ID, as illustrated.

As illustrated, the fairness index per routing ID BAP control PDU 900 further includes various reserved bits (marked "R"). This may help promote octet alignment within the aggregate fairness index per routing ID BAP control PDU 900 among the various data fields, in the manner shown. In some embodiments, a fairness index per routing ID BAP control PDU is sent without the reserved bits (and the various data fields are adjusted to fit be adjacent by ignoring any octet alignment considerations). In these embodiments, such a fairness index per routing ID BAP control PDU may use less resources (bits) than the fairness index per routing ID BAP control PDU 900.

A packet drop metric may be determined at a CU and may be communicated to an TAB node in order to instruct it to drop certain packets. The use of the packet drop metric as herein described may allow for keeping track of packet drops beyond the regular targets maintained using an active queue management (AQM) scheme. It may ensure that multi-hop flows of the TAB network can still meet QoS requirements.

The CU of the IAB donor may receive, from a 5GC, the manner in which the UE QoS is being maintained in terms of a packet loss rate (PLR). Using this information and based on, for example, one or more per-hop latency for aggregated traffic per routing ID per IAB node metrics and/or per-hop latency for aggregated traffic per BH RLC channel ID per IAB node metrics (each described below) in the case of N:1 mappings at the child IAB or mapping using 38.314 and the packet error rate at a different hop using 38.314, the CU can determine a relative list of packets to drop at a particular hop.

FIG. 10 illustrates a fairness index per routing ID packet drop BAP control PDU 1000 for transporting a packet drop metric, according to an embodiment. As illustrated, the packet drop BAP control PDU 1000 includes a D/C bit, which acts to indicate whether the packet drop BAP control PDU 1000 is a control PDU or a data PDU (in some cases, for the control PDU, the D/C bit may be set to 0 for control).

The packet drop BAP control PDU 1000 further includes the PDU type field. The appropriate PDU type ID for the packet drop BAP control PDU 1000 (1001) may be inserted into this field.

The packet drop BAP control PDU 1000 further includes a destination field that indicates the child IAB that should implement the packet drop that is instructed. This destination field may be used by intermediate IAB nodes for routing purposes.

The packet drop BAP control PDU 1000 further includes a sequence number (SN)-Start field that indicates a starting sequence number of the packets to drop. This field may have been taken from an RLC layer.

The packet drop BAP control PDU 1000 further includes a sequence number (SN)-End field that indicates an ending sequence number of the packets to drop. This field may have been taken from an RLC layer.

The packet drop BAP control PDU 1000 further includes an SO-End field that is used to identify the packets to be dropped in the case that segmentation is present at the RLC layer. This field may have been taken from an RLC layer.

The packet drop BAP control PDU 1000 further includes a BH RLC channel ID field that indicates the applicable BR RLC channel ID to which the packet drop instruction should be applied.

As illustrated, the packet drop BAP control PDU 1000 further includes various reserved bits (marked "R"). This may help promote octet alignment within the packet drop BAP control PDU 1000 among the various data fields, in the manner shown. In some embodiments, a packet drop BAP control PDU is sent without the reserved bits (and the various data fields are adjusted to fit be adjacent by ignoring any octet alignment considerations). In these embodiments, such a packet drop BAP control PDU may use less resources (bits) than the packet drop BAP control PDU 1000.

A per-hop latency for aggregated traffic per BH RLC channel ID per IAB node metric and/or a per-hop latency for aggregated traffic per routing ID per IAB node metric may be received which corresponds to one or more data flows at a downstream IAB node. A per-hop latency for aggregated traffic per BH RLC channel ID per IAB node metric and/or a per-hop latency for aggregated traffic per BH RLC channel ID per IAB node metric may, when combined with a number of hops metric, give a direct relationship on the latency budget available per hop to the CU. This metric may also be calculated at an IAB node, which can allow for further IAB node optimizations.

One way to implement a per-hop latency for aggregated traffic per BH RLC channel ID per IAB node metric and/or a per-hop latency for aggregated traffic per routing ID per IAB node metric may be user system frame numbers (SFNs) or the subframe numbers from the sender to the receiver as a timestamp. Such SFNs and/or subframe numbers could be implemented in a relative way, where the first IAB node can start the clock with a zero.

Another way to implement a per-hop latency for aggregated traffic per BH RLC channel ID per IAB node metric and/or a per-hop latency for aggregated traffic per routing ID per IAB node metric may be to timestamp random packets selected from different BH RLC channels across the topology of the IAB network. The granularity of such calculations could be handled by the CU of the IAB donor.

Figure 11:
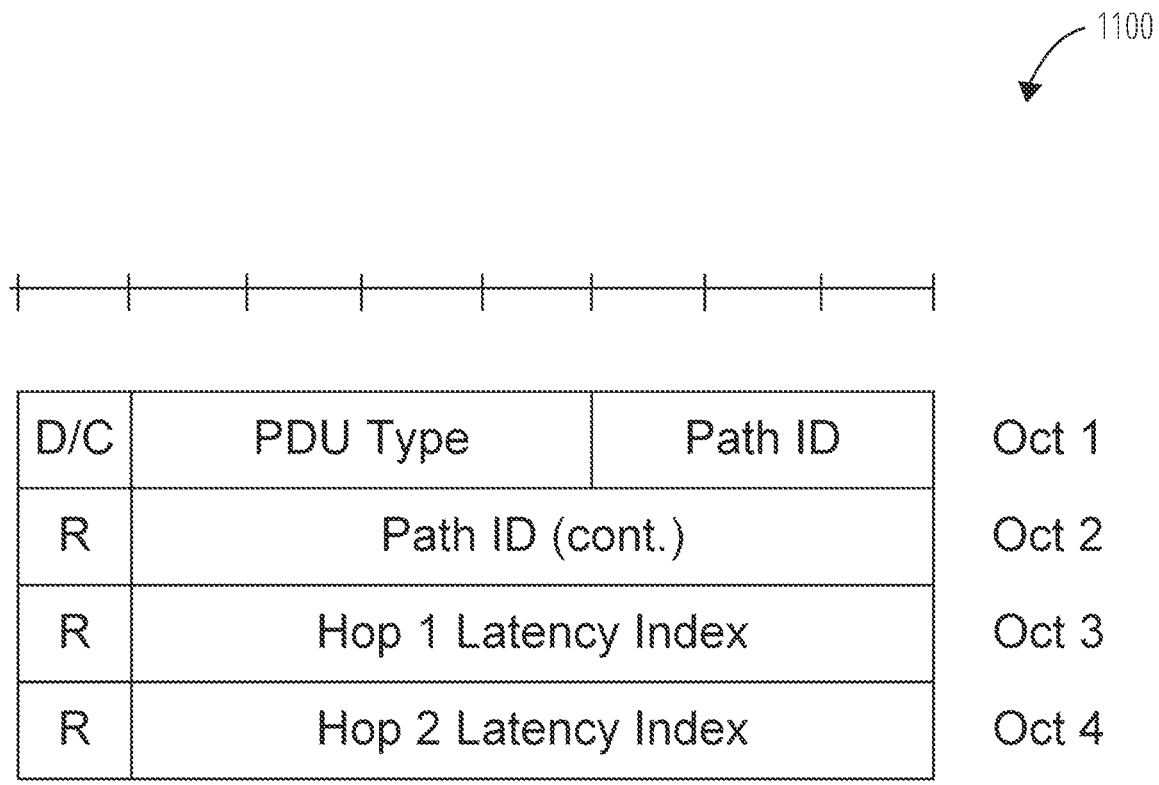
FIG. 11 illustrates a per-hop latency for aggregated traffic per BH RLC channel ID per IAB node BAP control PDU for transporting a per-hop latency for aggregated traffic per BH RLC channel ID per IAB node metric, according to an embodiment.

FIG. 11 illustrates a per-hop latency for aggregated traffic per BH RLC channel ID per TAB node BAP control PDU 1100 for transporting a per-hop latency for aggregated traffic per BH RLC channel ID per IAB node metric, according to an embodiment. As illustrated, the per-hop latency for aggregated traffic per BH RLC channel ID per IAB node BAP control PDU 1100 includes a D/C bit, which acts to indicate whether the per-hop latency for aggregated traffic per BH RLC channel ID per IAB node BAP control PDU 1100 is a control PDU or a data PDU (in some cases, for the control PDU, the D/C bit may be set to 0 for control).

The per-hop latency for aggregated traffic per BH RLC channel ID per IAB node BAP control PDU 1100 further includes the PDU type field. The appropriate PDU type ID for the per-hop latency for aggregated traffic per BH RLC channel ID per IAB node BAP control PDU 1100 (1010) may be inserted into this field.

The per-hop latency for aggregated traffic per BH RLC channel ID per IAB node BAP control PDU 1100 further includes one or more Path ID (BH RLC channel ID fields), which identify one or more paths (BH RLC channels) for which the per-hop latency for aggregated traffic per BH RLC channel ID per IAB node metric is being sent.

The per-hop latency for aggregated traffic per BH RLC channel ID per IAB node BAP control PDU 1100 further includes one or more hop latency indexes, which relate the latency index(es) (per IAB node) themselves for a corresponding path (BH RLC channel), as illustrated (which together may represent the per-hop latency for aggregated traffic per BH RLC channel ID per IAB node metric). These may be of the number necessary to represent all the necessary hops (and may accordingly grow in number as the per-hop latency for aggregated traffic per BH RLC channel ID per TAB node BAP control PDU 1100 hops through TAB nodes of the system).

As illustrated, the per-hop latency for aggregated traffic per BH RLC channel ID per IAB node BAP control PDU 1100 further includes various reserved bits (marked "R"). This may help promote octet alignment within the per-hop latency for aggregated traffic per BH RLC channel ID per IAB node BAP control PDU 1100 among the various data fields, in the manner shown. In some embodiments, a per-hop latency for aggregated traffic per BH RLC channel ID per TAB node BAP control PDU is sent without the reserved bits (and the various data fields are adjusted to fit be adjacent by ignoring any octet alignment considerations). In these embodiments, such a per-hop latency for aggregated traffic per BH RLC channel ID per TAB node BAP control PDU may use less resources (bits) than the per-hop latency for aggregated traffic per BH RLC channel ID per TAB node BAP control PDU 1100.

Figure 12:
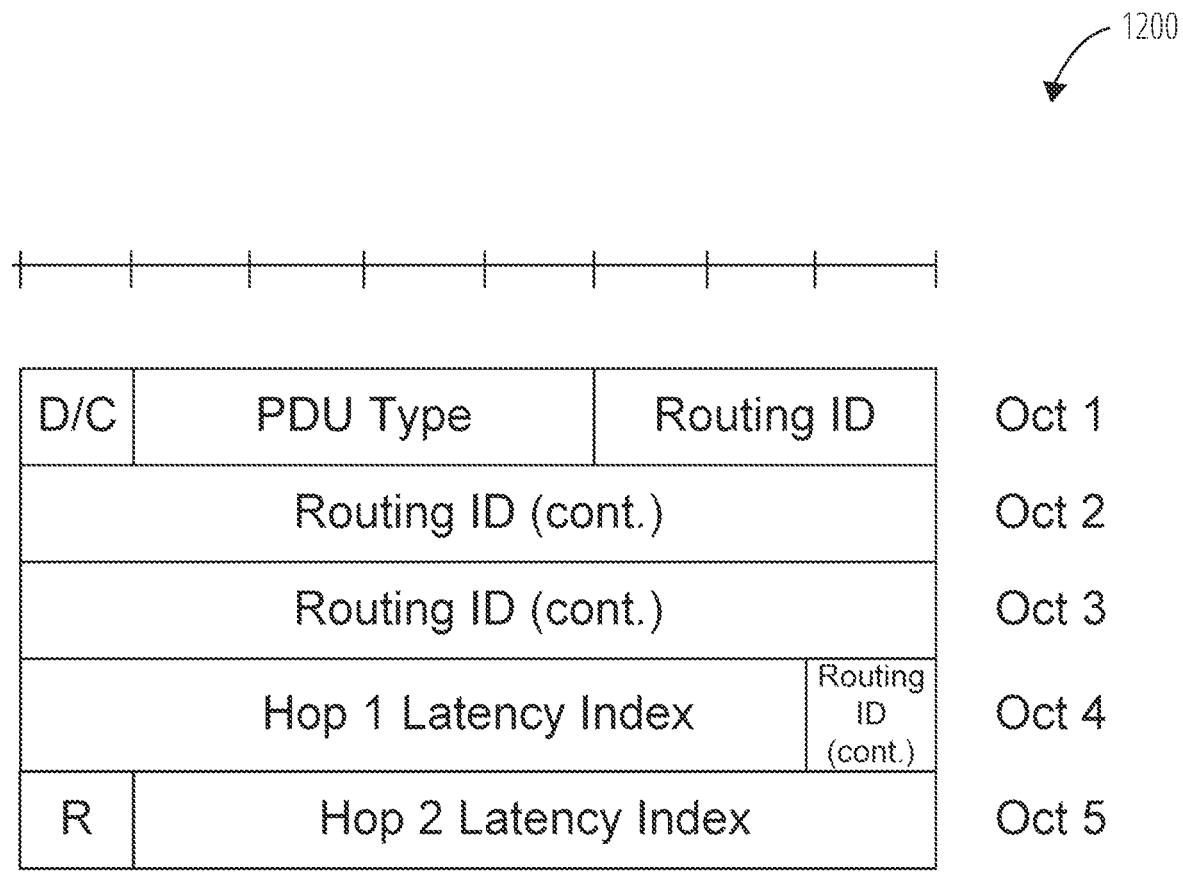
FIG. 12 illustrates a per-hop latency for aggregated traffic per routing ID per IAB node BAP control PDU for transporting a per-hop latency for aggregated traffic per routing ID per IAB node metric, according to an embodiment.

FIG. 12 illustrates a per-hop latency for aggregated traffic per routing TD per TAB node BAP control PDU 1200 for transporting a per-hop latency for aggregated traffic per routing ID per TAB node metric, according to an embodiment. As illustrated, the per-hop latency for aggregated traffic per routing ID per TAB node BAP control PDU 1200 includes a D/C bit, which acts to indicate whether the per-hop latency for aggregated traffic per routing ID per TAB node BAP control PDU 1200 is a control PDU or a data PDU (in some cases, for the control PDU, the D/C bit may be set to 0 for control).

The per-hop latency for aggregated traffic per routing ID per TAB node BAP control PDU 1200 further includes the PDU type field. The appropriate PDU type ID for the per-hop latency for aggregated traffic per routing ID per IAB node BAP control PDU 1200 (1011) may be inserted into this field.

The per-hop latency for aggregated traffic per routing ID per TAB node BAP control PDU 1200 further includes one or more routing ID fields, which identify one or more routing IDs for which the per-hop latency for aggregated traffic per routing ID per TAB node metric is being sent.

The per-hop latency for aggregated traffic per routing ID per IAB node BAP control PDU 1200 further includes one or more hop latency indexes, which relate the latency index(es) (per IAB node) themselves for a corresponding routing ID, as illustrated (which together may represent the per-hop latency for aggregated traffic per routing ID per TAB node metric). These may be of the number necessary to represent all the necessary hops (and may accordingly grow in number as the per-hop latency for aggregated traffic per routing ID per IAB node BAP control PDU 1200 hops through IAB nodes of the system).

As illustrated, the per-hop latency for aggregated traffic per routing ID per IAB node BAP control PDU 1200 further includes various reserved bits (marked "R"). This may help promote octet alignment within the per-hop latency for aggregated traffic per routing ID per IAB node BAP control PDU 1200 among the various data fields, in the manner shown. In some embodiments, a per-hop latency for aggregated traffic per routing ID per IAB node BAP control PDU is sent without the reserved bits (and the various data fields are adjusted to fit be adjacent by ignoring any octet alignment considerations). In these embodiments, such a per-hop latency for aggregated traffic per routing ID per IAB node BAP control PDU may use less resources (bits) than the per-hop latency for aggregated traffic per routing ID per IAB node BAP control PDU 1200.

Figure 13:
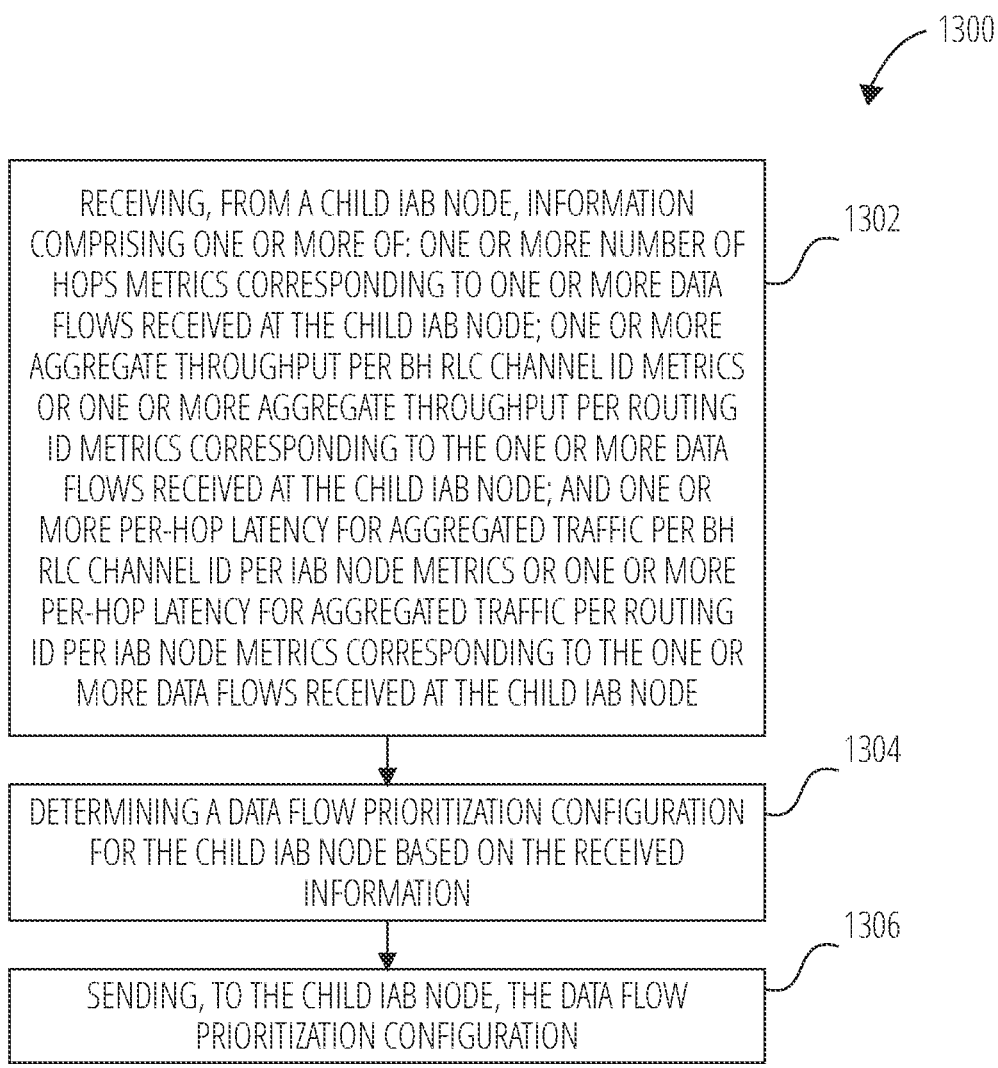
FIG. 13 illustrates a method of an IAB node of a wireless communication system, according to an embodiment.

FIG. 13 illustrates a method 1300 of a parent integrated access and backhaul (IAB) node of a wireless communication system, according to an embodiment.

The method 1300 includes receiving 1302, from a child TAB node, information comprising one or more of: one or more number of hops metrics corresponding to one or more data flows received at the child IAB node; one or more aggregate throughput per BH RLC channel ID metrics or one or more aggregate throughput per routing ID metrics corresponding to the one or more data flows received at the child IAB node; and one or more per-hop latency for aggregated traffic per BH RLC channel ID per IAB node metrics or one or more per-hop latency for aggregated traffic per routing ID per IAB node metrics corresponding to the one or more data flows received at the child IAB node.

The method 1300 further includes determining 1304 a data flow prioritization configuration for the child IAB node based on the received information.

The method 1300 further includes sending 1306, to the child IAB node, the data flow prioritization configuration.

In some embodiments of the method 1300, the data flow prioritization configuration is sent to the child IAB node in a BH BAP PDU.

In some embodiments of the method 1300, the data flow prioritization configuration is sent to the child IAB node on an F1AP interface.

Embodiments contemplated herein include an apparatus comprising means to perform one or more elements of the method 1300. This apparatus may be, for example, an apparatus of a UE 1600 as described below.

Embodiments contemplated herein include one or more non-transitory computer-readable media comprising instructions to cause an electronic device, upon execution of the instructions by one or more processors of the electronic device, to perform one or more elements of the method 1300. This non-transitory computer-readable media may be, for example, the memory 1606 of the UE 1600 described below, and/or the peripheral devices 2004, the memory/storage devices 2014, and/or the databases 2020 of the components 1300 as described below.

Embodiments contemplated herein include an apparatus comprising logic, modules, or circuitry to perform one or more elements of the method 1300. This apparatus may be, for example, an apparatus of a UE 1600 as described below.

Embodiments contemplated herein include an apparatus comprising: one or more processors and one or more computer-readable media comprising instructions that, when executed by the one or more processors, cause the one or more processors to perform one or more elements of the method 1300. This apparatus may be, for example, an apparatus of a UE 1600 as described below.

Embodiments contemplated herein include a signal as described in or related to one or more elements of the method 1300.

Embodiments contemplated herein include a datagram, packet, frame, segment, protocol data unit (PDU), or message as described in or related to one or more elements of the method 1300.

Embodiments contemplated herein include a signal encoded with data as described in or related to one or more elements of the method 1300.

Embodiments contemplated herein include a signal encoded with a datagram, packet, frame, segment, PDU, or message as described in or related to one or more elements of the method 1300.

Embodiments contemplated herein include an electromagnetic signal carrying computer-readable instructions, wherein execution of the computer-readable instructions by one or more processors is to cause the one or more processors to perform one or more elements of the method 1300.

Embodiments contemplated herein include a computer program comprising instructions, wherein execution of the program by a processing element is to cause the processing element to carry out one or more elements of the method 1300. These instructions may be, for example, the instructions 2012 of the components 2000 as described below.

Figure 14:
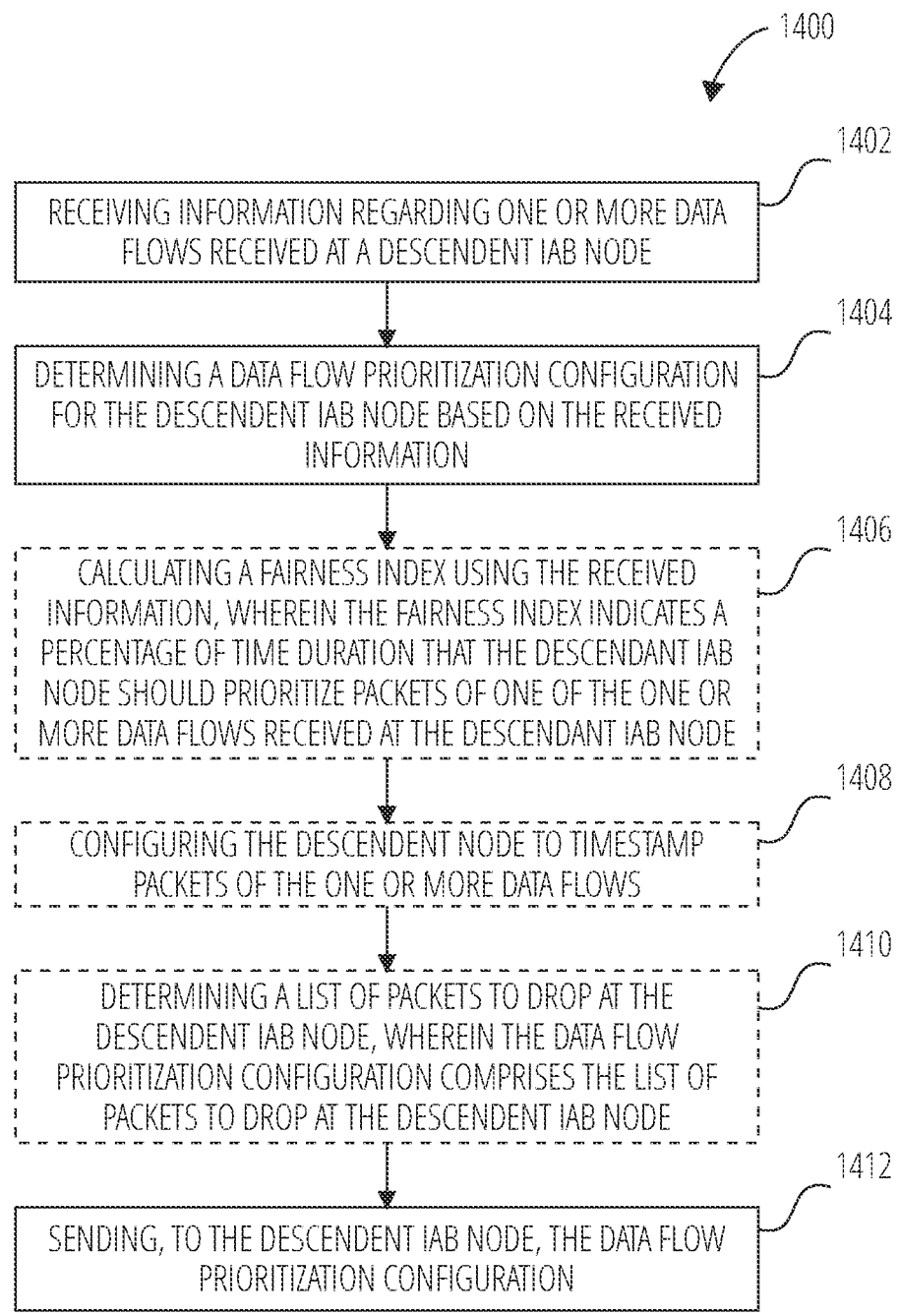
FIG. 14 illustrates a method of a donor IAB node of a wireless communication system, according to an embodiment.

FIG. 14 illustrates a method 1400 of a donor integrated access and backhaul (IAB) node of a wireless communication system, according to an embodiment.

The method 1400 includes receiving 1402 information regarding one or more data flows received at a descendent IAB node.

The method 1400 further includes determining 1404 a data flow prioritization configuration for the descendent IAB node based on the received information.

The method 1400 further optionally includes calculating 1406 a fairness index using the received information, wherein the fairness index indicates a percentage of time duration that the descendant IAB node should prioritize packets of one of the one or more data flows received at the descendant IAB node.

The method 1400 further optionally includes configuring 1408 the descendent node to timestamp packets of the one or more data flows.

The method 1400 further optionally includes determining 1410 a list of packets to drop at the descendent TAB node, wherein the data flow prioritization configuration comprises the list of packets to drop at the descendent IAB node.

The method 1400 further includes sending 1412, to the descendent IAB node, the data flow prioritization configuration.

In some embodiments of the method 1400, the information regarding the one or more data flows received at the descendent node is received from the descendent node on an F1AP interface.

In some embodiments of the method 1400, the information regarding the one or more data flows received at the descendent node is received from a child node that is not the descendent node in a BH adaptation header BAP PDU.

In some embodiments of the method 1400 that include the calculating 1406 a fairness index, the one or more data flows received at the descendent node comprises one or more number of hops metrics corresponding to the one or more data flows received at the descendant TAB node and 1) one or more aggregate throughput per backhaul BH RLC channel ID metrics or 2) one or more aggregate throughput per routing ID metrics corresponding to the one or more data flows received at the descendent TAB node; the fairness index indicates a percentage of time duration that the descendant TAB node should prioritize packets of one of the one or more data flows received at the descendant TAB node; and the data flow prioritization configuration comprises the fairness index.

In some embodiments of the method 1400 that include the determining 1410 a list of packets to drop, the data flow prioritization configuration comprises the list of packets to drop at the descendent TAB node. In some of these embodiments, the one or more per-hop latency metrics corresponding to the one or more data flows is indicated per a BH RLC channel of each of the one or more data flows. In some of these embodiments of the method 1400 that also include the configuring 1408 the descendent node to timestamp packets of the one or more data flows, the received information regarding one or more data flows comprises the timestamps of the packets of the one or more data flows.

Embodiments contemplated herein include an apparatus comprising means to perform one or more elements of the method 1400. This apparatus may be, for example, an apparatus of a UE 1600 as described below.

Embodiments contemplated herein include one or more non-transitory computer-readable media comprising instructions to cause an electronic device, upon execution of the instructions by one or more processors of the electronic device, to perform one or more elements of the method 1400. This non-transitory computer-readable media may be, for example, the memory 1606 of the UE 1600 described below, and/or the peripheral devices 2004, the memory/storage devices 2014, and/or the databases 2020 of the components 1300 as described below.

Embodiments contemplated herein include an apparatus comprising logic, modules, or circuitry to perform one or more elements of the method 1400. This apparatus may be, for example, an apparatus of a UE 1600 as described below.

Embodiments contemplated herein include an apparatus comprising: one or more processors and one or more computer-readable media comprising instructions that, when executed by the one or more processors, cause the one or more processors to perform one or more elements of the method 1400. This apparatus may be, for example, an apparatus of a UE 1600 as described below.

Embodiments contemplated herein include a signal as described in or related to one or more elements of the method 1400.

Embodiments contemplated herein include a datagram, packet, frame, segment, protocol data unit (PDU), or message as described in or related to one or more elements of the method 1400.

Embodiments contemplated herein include a signal encoded with data as described in or related to one or more elements of the method 1400.

Embodiments contemplated herein include a signal encoded with a datagram, packet, frame, segment, PDU, or message as described in or related to one or more elements of the method 1400.

Embodiments contemplated herein include an electromagnetic signal carrying computer-readable instructions, wherein execution of the computer-readable instructions by one or more processors is to cause the one or more processors to perform one or more elements of the method 1400.

Embodiments contemplated herein include a computer program comprising instructions, wherein execution of the program by a processing element is to cause the processing element to carry out one or more elements of the method 1400. These instructions may be, for example, the instructions 2012 of the components 2000 as described below.

Figure 15:
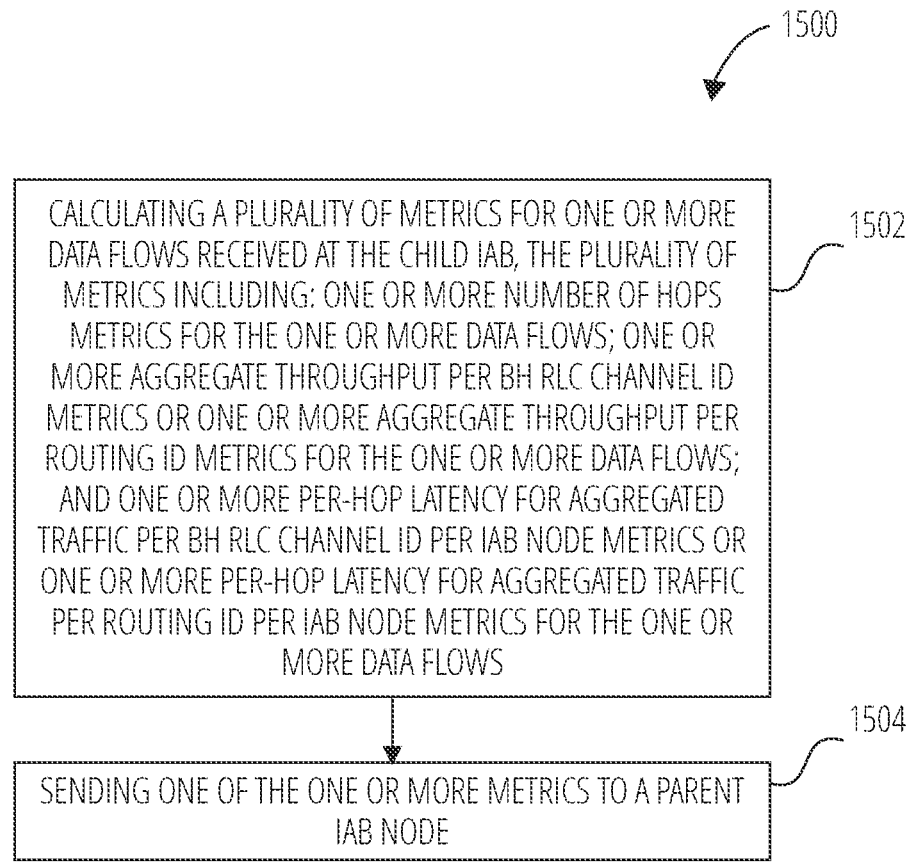
FIG. 15 illustrates a method of a child IAB node of a wireless communication system, according to an embodiment.

FIG. 15 illustrates a method 1500 of a child integrated access and backhaul (IAB) node of a wireless communication system, according to an embodiment.

The method 1500 includes calculating 1502 a plurality of metrics for one or more data flows received at the child IAB, the plurality of metrics including: one or more number of hops metrics for the one or more data flows; one or more aggregate throughput per BH RLC channel ID metrics or one or more aggregate throughput per routing ID metrics for the one or more data flows; and one or more per-hop latency for aggregated traffic per BH RLC channel ID per IAB node metrics or one or more per-hop latency for aggregated traffic per routing ID per IAB node metrics for the one or more data flows.

The method 1500 further includes sending 1504 one of the one or more metrics to a parent IAB node.

In some embodiments of the method 1500, the one of the plurality of metrics is sent to the parent IAB node in a BH adaptation header BAP PDU.

In some embodiments of the method 1500, the one of the plurality of metrics is sent to the parent IAB node using an F1AP interface.

In some embodiments of the method 1500, the one or more number of hops metrics are each calculated by incrementing a counter received at the child IAB node that corresponds to a data flow received at the child IAB node.

In some embodiments of the method 1500, the one or more aggregate throughput per BH RLC channel ID metrics or the one or more aggregate throughput per routing ID metrics for the one or more data flows are each calculated by dividing a number of RLC SDUs by a number of corresponding acknowledgements received for the RLC SDUs.

In some embodiments of the method 1500, the one or more per-hop latency per BH RLC channel ID metrics are each calculated by referring to one of SFNs and subframe numbers received in each of the one or more data flows.

Embodiments contemplated herein include an apparatus comprising means to perform one or more elements of the method 1500. This apparatus may be, for example, an apparatus of a UE 1600 as described below.

Embodiments contemplated herein include one or more non-transitory computer-readable media comprising instructions to cause an electronic device, upon execution of the instructions by one or more processors of the electronic device, to perform one or more elements of the method 1500. This non-transitory computer-readable media may be, for example, the memory 1606 of the UE 1600 described below, and/or the peripheral devices 2004, the memory/storage devices 2014, and/or the databases 2020 of the components 1300 as described below.

Embodiments contemplated herein include an apparatus comprising logic, modules, or circuitry to perform one or more elements of the method 1500. This apparatus may be, for example, an apparatus of a UE 1600 as described below.

Embodiments contemplated herein include an apparatus comprising: one or more processors and one or more computer-readable media comprising instructions that, when executed by the one or more processors, cause the one or more processors to perform one or more elements of the method 1500. This apparatus may be, for example, an apparatus of a UE 1600 as described below.

Embodiments contemplated herein include a signal as described in or related to one or more elements of the method 1500.

Embodiments contemplated herein include a datagram, packet, frame, segment, protocol data unit (PDU), or message as described in or related to one or more elements of the method 1500.

Embodiments contemplated herein include a signal encoded with data as described in or related to one or more elements of the method 1500.

Embodiments contemplated herein include a signal encoded with a datagram, packet, frame, segment, PDU, or message as described in or related to one or more elements of the method 1500.

Embodiments contemplated herein include an electromagnetic signal carrying computer-readable instructions, wherein execution of the computer-readable instructions by one or more processors is to cause the one or more processors to perform one or more elements of the method 1500.

Embodiments contemplated herein include a computer program comprising instructions, wherein execution of the program by a processing element is to cause the processing element to carry out one or more elements of the method 1500. These instructions may be, for example, the instructions 2012 of the components 2000 as described below.

Figure 16:
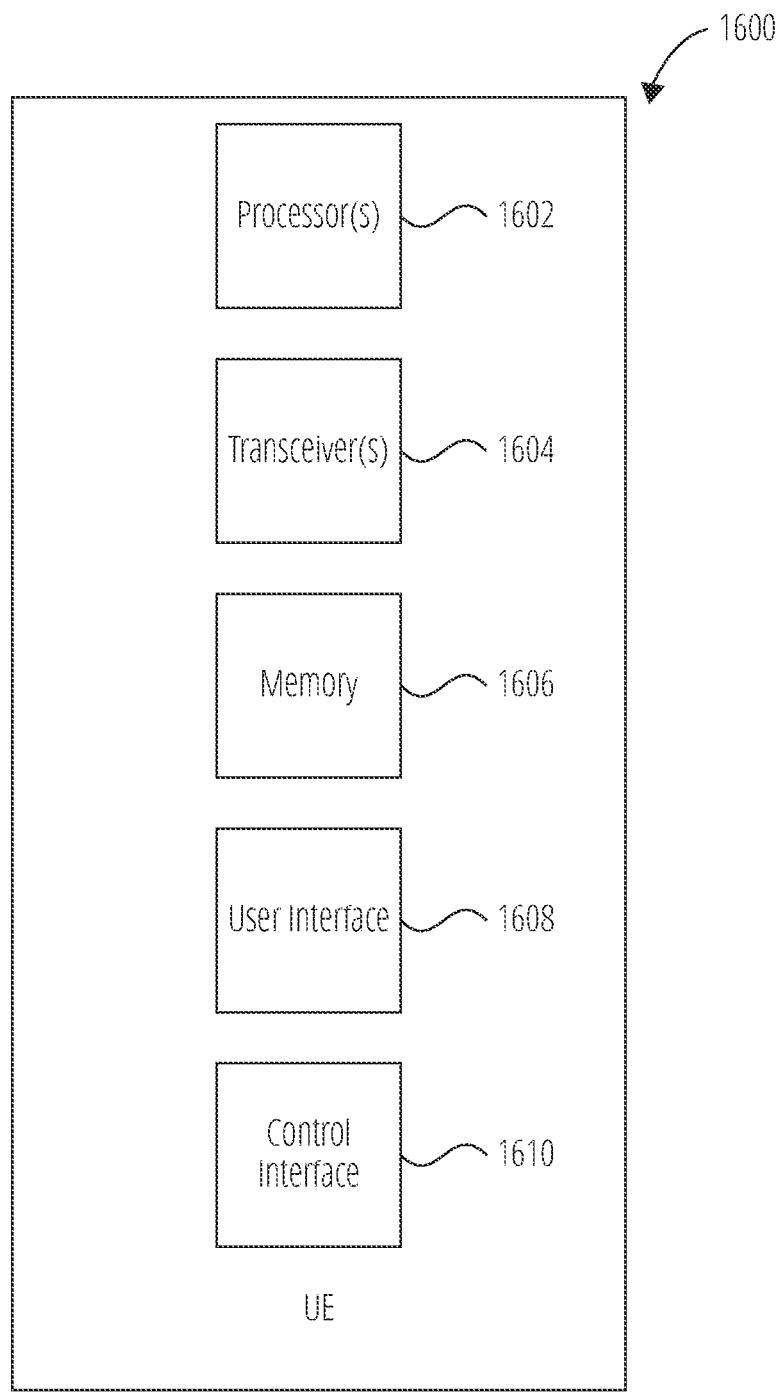
FIG. 16 illustrates a UE in accordance with one embodiment.

FIG. 16 is a block diagram of an example UE 1600 configurable according to various embodiments of the present disclosure, including by execution of instructions on a computer-readable medium that correspond to any of the example methods and/or procedures described herein. The UE 1600 comprises one or more processor 1602, transceiver 1604, memory 1606, user interface 1608, and control interface 1610.

The one or more processor 1602 may include, for example, an application processor, an audio digital signal processor, a central processing unit, and/or one or more baseband processors. Each of the one or more processor 1602 may include internal memory and/or may include interface(s) to communication with external memory (including the memory 1606). The internal or external memory can store software code, programs, and/or instructions for execution by the one or more processor 1602 to configure and/or facilitate the UE 1600 to perform various operations, including operations described herein. For example, execution of the instructions can configure the UE 1600 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 1604, user interface 1608, and/or control interface 1610. As another example, the one or more processor 1602 may execute program code stored in the memory 1606 or other memory that corresponds to MAC, RLC, PDCP, and RRC layer protocols standardized by 3GPP (e.g., for NR and/or LTE). As a further example, the processor 1602 may execute program code stored in the memory 1606 or other memory that, together with the one or more transceiver 1604, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 1606 may comprise memory area for the one or more processor 1602 to store variables used in protocols, configuration, control, and other functions of the UE 1600, including operations corresponding to, or comprising, any of the example methods and/or procedures described herein. Moreover, the memory 1606 may comprise non-volatile memory (e.g., flash memory), volatile memory (e.g., static or dynamic RAM), or a combination thereof. Furthermore, the memory 1606 may interface with a memory slot by which removable memory cards in one or more formats (e.g., SD Card, Memory Stick, Compact Flash, etc.) can be inserted and removed.

The one or more transceiver 1604 may include radio-frequency transmitter and/or receiver circuitry that facilitates the UE 1600 to communicate with other equipment supporting like wireless communication standards and/or protocols. For example, the one or more transceiver 1604 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 1602. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 1604 includes a transmitter and a receiver that enable the UE 1600 to communicate with various 5G/NR networks according to various protocols and/or methods proposed for standardization by 3 GPP and/or other standards bodies. For example, such functionality can operate cooperatively with the one or more processor 1602 to implement a PHY layer based on OFDM, OFDMA, and/or SC-FDMA technologies, such as described herein with respect to other figures.

The user interface 1608 may take various forms depending on particular embodiments, or can be absent from the UE 1600. In some embodiments, the user interface 1608 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1600 may comprise a tablet computing device including a larger touchscreen display. In such embodiments, one or more of the mechanical features of the user interface 1608 may be replaced by comparable or functionally equivalent virtual user interface features (e.g., virtual keypad, virtual buttons, etc.) implemented using the touchscreen display, as familiar to persons of ordinary skill in the art. In other embodiments, the UE 1600 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 1600 having a touch screen display are capable of receiving user inputs, such as inputs related to exemplary methods and/or procedures described herein or otherwise known to persons of ordinary skill in the art.

In some exemplary embodiments of the present disclosure, the UE 1600 may include an orientation sensor, which can be used in various ways by features and functions of the UE 1600. For example, the UE 1600 can use outputs of the orientation sensor to determine when a user has changed the physical orientation of the UE 1600's touch screen display. An indication signal from the orientation sensor can be available to any application program executing on the UE 1600, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 1610 may take various forms depending on particular embodiments. For example, the control interface 1610 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 1610 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1600 may include more functionality than is shown in FIG. 16 including, for example, a video and/or still-image camera, microphone, media player and/or recorder, etc. Moreover, the one or more transceiver 1604 may include circuitry for communication using additional radio-frequency communication standards including Bluetooth, GPS, and/or others. Moreover, the one or more processor 1602 may execute software code stored in the memory 1606 to control such additional functionality. For example, directional velocity and/or position estimates output from a GPS receiver can be available to any application program executing on the UE 1600, including various exemplary methods and/or computer-readable media according to various exemplary embodiments of the present disclosure.

Figure 17:
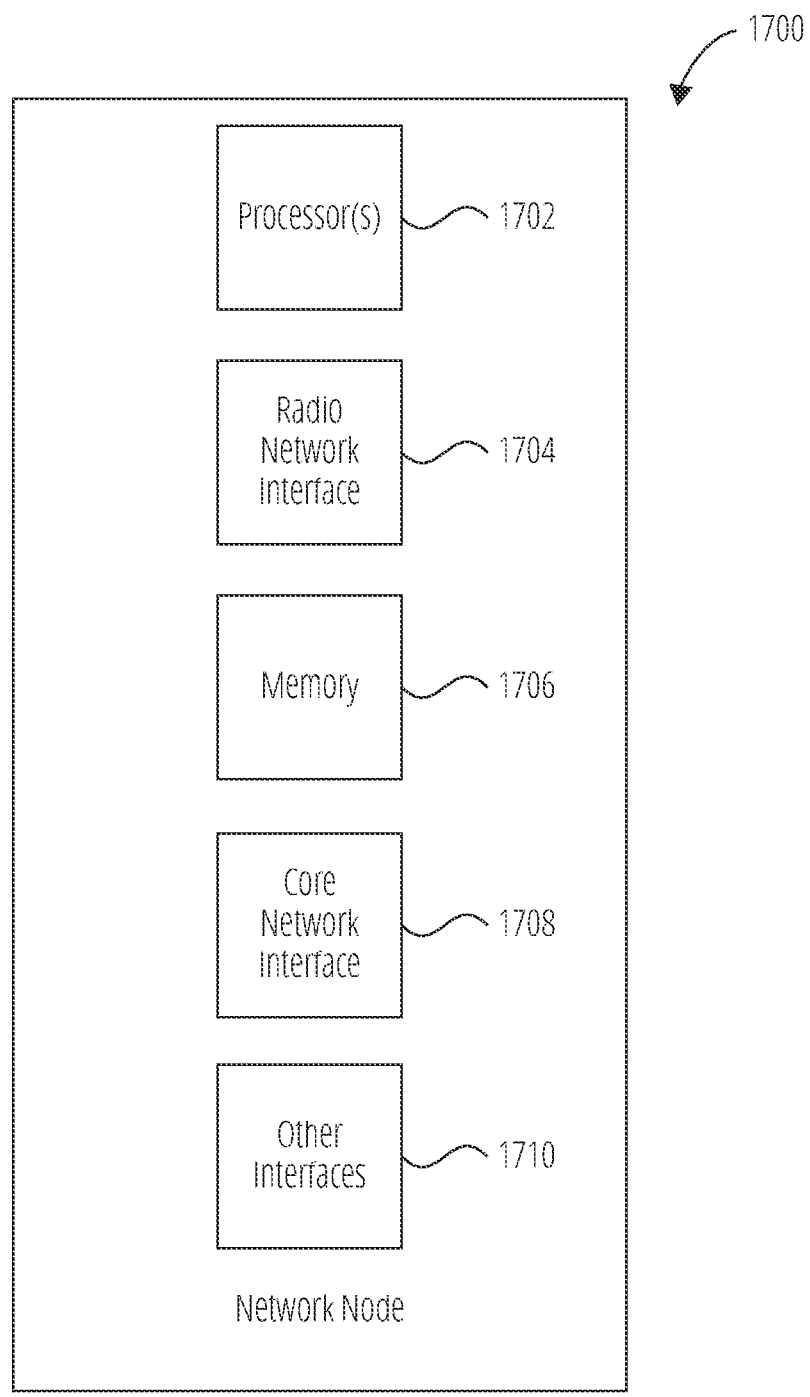
FIG. 17 illustrates a network node in accordance with one embodiment.

FIG. 17 is a block diagram of an example network node 1700 configurable according to various embodiments of the present disclosure, including by execution of instructions on a computer-readable medium that correspond to any of the example methods and/or procedures described herein.

The network node 1700 includes a one or more processor 1702, a radio network interface 1704, a memory 1706, a core network interface 1708, and other interfaces 1710. The network node 1700 may comprise, for example, a base station, eNB, gNB, access node, or component thereof.

The one or more processor 1702 may include any type of processor or processing circuitry and may be configured to perform an of the methods or procedures disclosed herein. The memory 1706 may store software code, programs, and/or instructions executed by the one or more processor 1702 to configure the network node 1700 to perform various operations, including operations described herein. For example, execution of such stored instructions can configure the network node 1700 to communicate with one or more other devices using protocols according to various embodiments of the present disclosure, including one or more methods and/or procedures discussed above. Furthermore, execution of such stored instructions can also configure and/or facilitate the network node 1700 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1704 and the core network interface 1708. By way of example and without limitation, the core network interface 1708 comprise an S1 interface and the radio network interface 1704 may comprise a Uu interface, as standardized by 3GPP. The memory 1706 may also store variables used in protocols, configuration, control, and other functions of the network node 1700. As such, the memory 1706 may comprise non-volatile memory (e.g., flash memory, hard disk, etc.), volatile memory (e.g., static or dynamic RAM), network-based (e.g., "cloud") storage, or a combination thereof.

The radio network interface 1704 may include transmitters, receivers, signal processors, ASICs, antennas, beamforming units, and other circuitry that enables network node 1700 to communicate with other equipment such as, in some embodiments, a plurality of compatible user equipment (UE). In some embodiments, the network node 1700 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1704 may include a PHY layer based on OFDM, OFDMA, and/or SC-FDMA technologies. In some embodiments, the functionality of such a PHY layer can be provided cooperatively by the radio network interface 1704 and the one or more processor 1702.

The core network interface 1708 may include transmitters, receivers, and other circuitry that enables the network node 1700 to communicate with other equipment in a core network such as, in some embodiments, circuit-switched (CS) and/or packet-switched Core (PS) networks. In some embodiments, the core network interface 1708 may include the S1 interface standardized by 3GPP. In some embodiments, the core network interface 1708 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1708 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1710 may include transmitters, receivers, and other circuitry that enables the network node 1700 to communicate with external networks, computers, databases, and the like for purposes of operations, administration, and maintenance of the network node 1700 or other network equipment operably connected thereto.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 18:
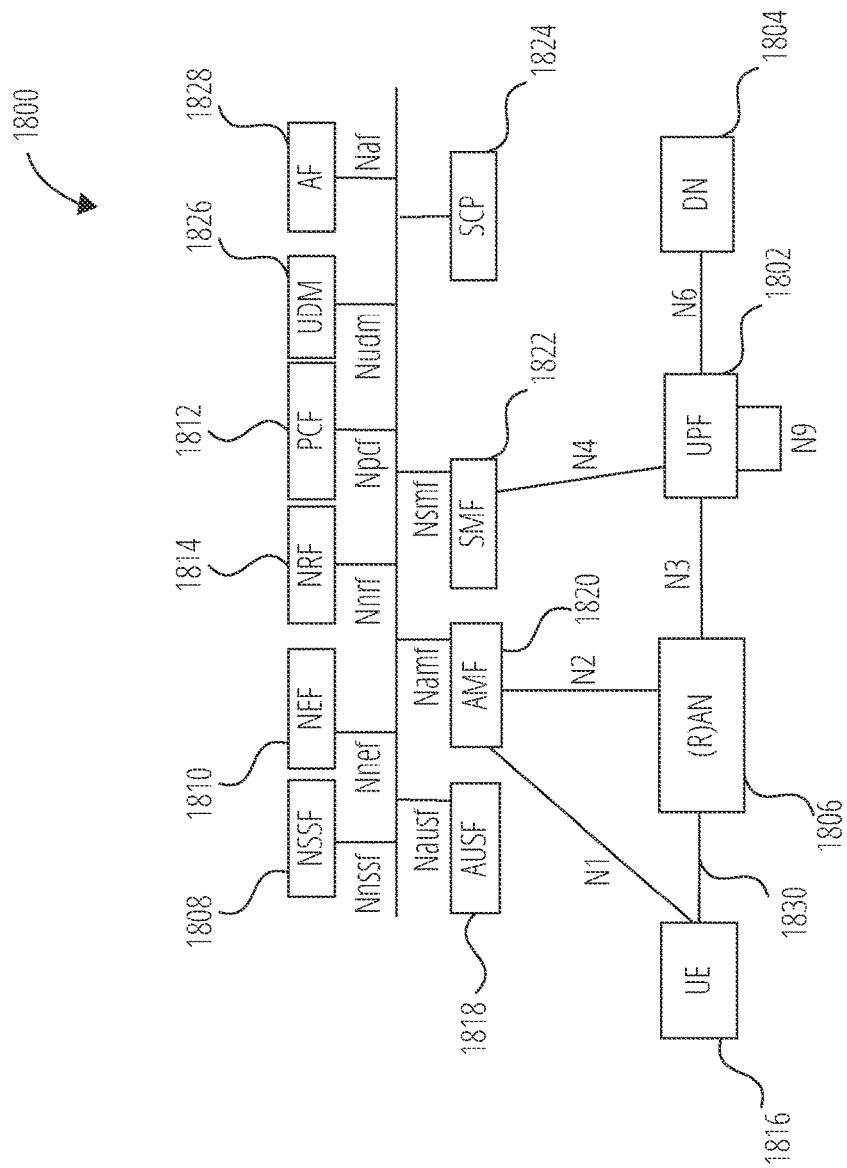
FIG. 18 illustrates an example service based architecture in accordance with certain embodiments.

FIG. 18 illustrates a service based architecture 1800 in 5GS according to one embodiment. As described in 3GPP TS 23.501, the service based architecture 1800 comprises NFs such as an NSSF 1808, a NEF 1810, an NRF 1814, a PCF 1812, a UDM 1826, an AUSF 1818, an AMF 1820, an SMF 1822, for communication with a UE 1816, a (R)AN 1806, a UPF 1802, and a DN 1804. The NFs and NF services can communicate directly, referred to as Direct Communication, or indirectly via a SCP 1824, referred to as Indirect Communication. FIG. 18 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 18 are described below.

The NSSF 1808 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 1810 supports exposure of capabilities and events. NF capabilities and events may be securely exposed by the NEF 1810 (e.g., for 3rd party, Application Functions, and/or Edge Computing). The NEF 1810 may store/retrieve information as structured data using a standardized interface (Nudr) to a UDR. The NEF 1810 may also secure provision of information from an external application to 3GPP network and may provide for the Application Functions to securely provide information to the 3GPP network (e.g., expected UE behavior, 5GLAN group information, and service specific information), wherein the NEF 1810 may authenticate and authorize and assist in throttling the Application Functions. The NEF 1810 may provide translation of internal-external information by translating between information exchanged with the AF 1828 and information exchanged with the internal network function. For example, the NEF 1810 translates between an AF-Service-Identifier and internal 5G Core information such as DNN and S-NSSAI. The NEF 1810 may handle masking of network and user sensitive information to external AF's according to the network policy. The NEF 1810 may receive information from other network functions (based on exposed capabilities of other network functions), and stores the received information as structured data using a standardized interface to a UDR. The stored information can be accessed and re-exposed by the NEF 1810 to other network functions and Application Functions, and used for other purposes such as analytics. For external exposure of services related to specific UE(s), the NEF 1810 may reside in the HPLMN. Depending on operator agreements, the NEF 1810 in the HPLMN may have interface(s) with NF(s) in the VPLMN. When a UE is capable of switching between EPC and 5GC, an SCEF+NEF may be used for service exposure.

The NRF 1814 supports service discovery function by receiving an NF Discovery Request from an NF instance or SCP and providing the information of the discovered NF instances to the NF instance or SCP. The NRF 1814 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 1812 supports a unified policy framework to govern network behavior. The PCF 1812 provides policy rules to Control Plane function(s) to enforce them. The PCF 1812 accesses subscription information relevant for policy decisions in a Unified Data Repository (UDR). The PCF 1812 may access the UDR located in the same PLMN as the PCF.

The UDM 1826 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 1826 uses subscription data (including authentication data) that may be stored in a UDR, in which case a UDM implements the application logic and may not require an internal user data storage and several different UDMs may serve the same user in different transactions. The UDM 1826 may be located in the HPLMN of the subscribers it serves, and may access the information of the UDR located in the same PLMN.

The AUSF 1818 supports authentication for 3GPP access and untrusted non-3GPP access. The AUSF 1818 may also provide support for Network Slice-Specific Authentication and Authorization.

The AMF 1820 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 1820. Regardless of the number of Network functions, in certain embodiments there is only one NAS interface instance per access network between the UE and the CN, terminated at one of the Network functions that implements at least NAS security and Mobility Management. The AMF 1820 may also include policy related functionalities.

In addition to the functionalities described above, the AMF 1820 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a co-ordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 1822 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 1822 may include policy related functionalities.

The SCP 1824 includes one or more of the following functionalities. Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 1824 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 1816 may include a device with radio communication capabilities. For example, the UE 1816 may comprise a smartphone (e.g., handheld touchscreen mobile computing devices connectable to one or more cellular networks). The UE 1816 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 1816 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 1816 may be configured to connect or communicatively couple with the (R)AN 1806 through a radio interface 1830, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 1816 and the (R)AN 1806 may use a Uu interface (e.g., an LTE-Uu interface) to exchange control plane data via a protocol stack comprising a PHY layer, an MAC layer, an RLC layer, a PDCP layer, and an RRC layer. A DL transmission may be from the (R)AN 1806 to the UE 1816 and a UL transmission may be from the UE 1816 to the (R)AN 1806. The UE 1816 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 1806 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 1806 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 1806) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 1816 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 1802 may act as an anchor point for intra-RAT and inter-RAT mobility, an external PDU session point of interconnect to the DN 1804, and a branching point to support multi-homed PDU session. The UPF 1802 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 1802 may include an uplink classifier to support routing traffic flows to a data network. The DN 1804 may represent various network operator services, Internet access, or third party services. The DN 1804 may include, for example, an application server.

Figure 19:
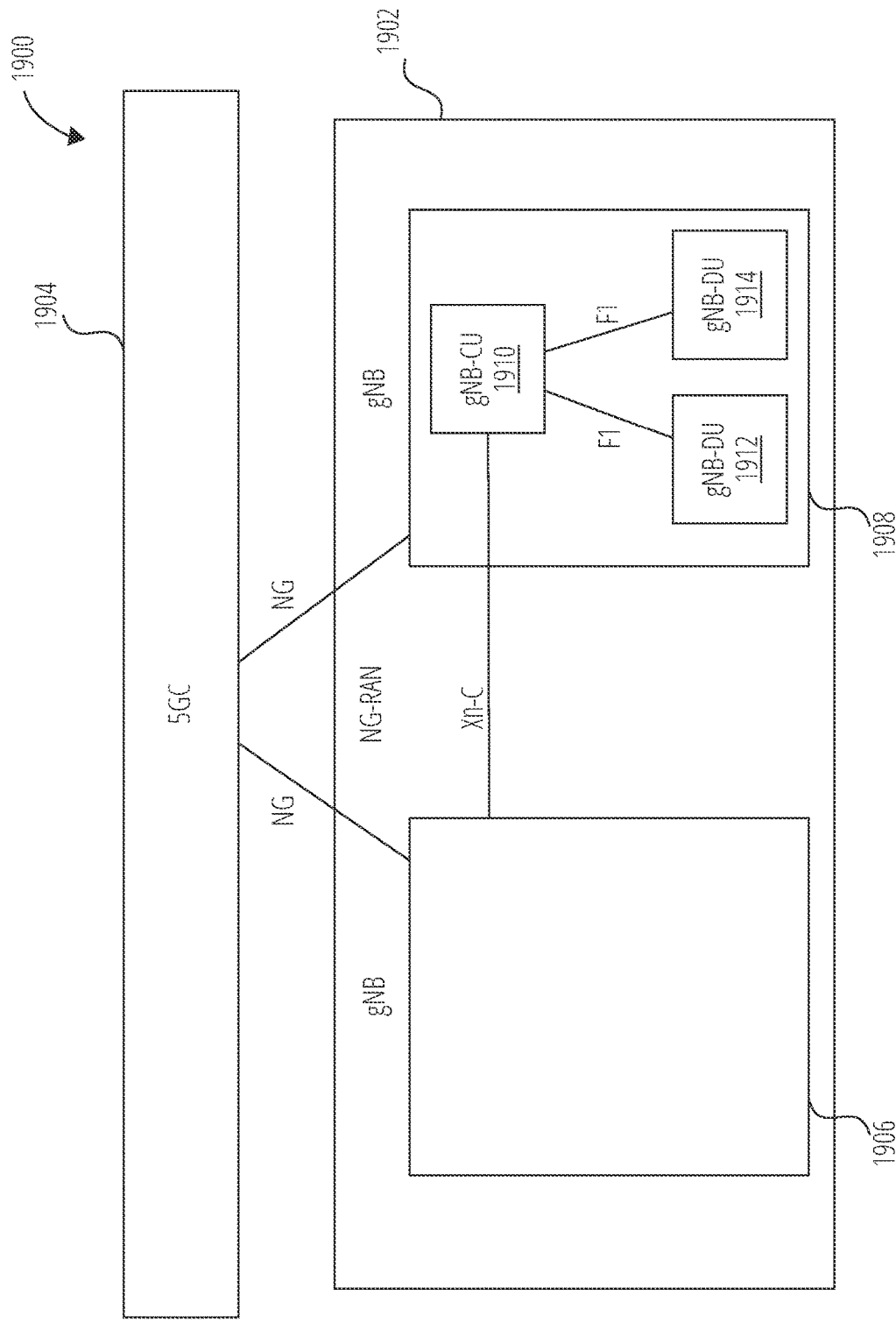
FIG. 19 illustrates an NG-RAN architecture in accordance with one embodiment.

FIG. 19 illustrates an NG-RAN architecture 1900, according to one embodiment, comprising a 5GC 1904 and an NG-RAN 1902. The NG-RAN 1902 includes a plurality of gNB (two gNB shown as gNB 1906 and gNB 1908) connected to the 5GC 1904 through the NG interface. The gNB 1906 and gNB 1908 can support FDD mode, TDD mode, or dual mode operation, and are connected to one another through the Xn-C interface. As shown, the gNB 1908 includes a gNB-CU 1910 connected to a gNB-DU 1912 and a gNB-DU 1914 through the F1 interface. The gNB 1908 may include only a single gNB-DU or more than the two gNB-DUs shown. The NG interface, Xn-C interface, and F1 interface are logical interfaces.

Figure 20:
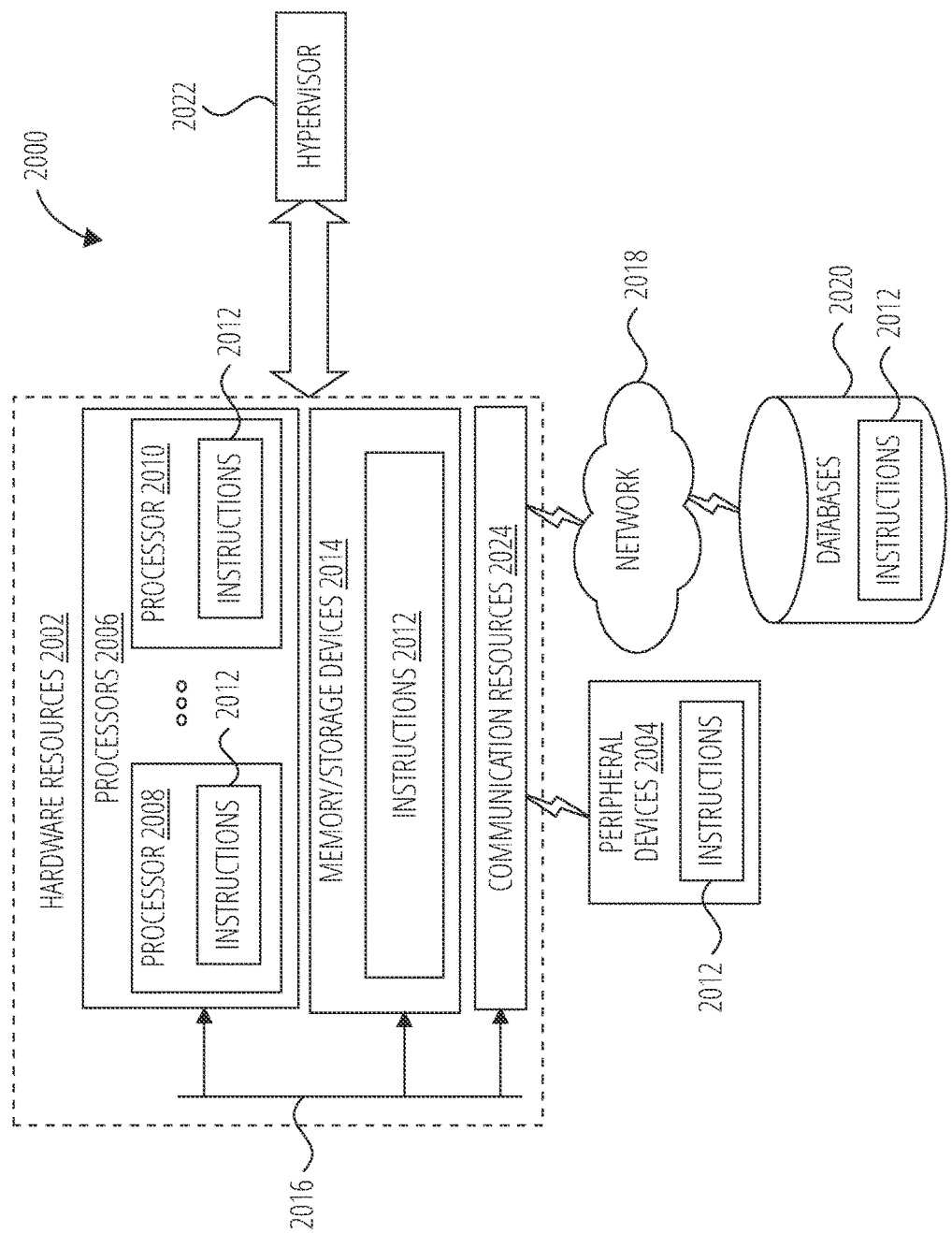
FIG. 20 illustrates components in accordance with one embodiment.

FIG. 20 is a block diagram illustrating components 2000, according to some example embodiments, able to read instructions from a machine-readable or computer-readable medium (e.g., a non-transitory machine-readable storage medium) and perform any one or more of the methodologies discussed herein. Specifically, FIG. 20 shows a diagrammatic representation of hardware resources 2002 including one or more processors 2006 (or processor cores), one or more memory/storage devices 2014, and one or more communication resources 2024, each of which may be communicatively coupled via a bus 2016. For embodiments where node virtualization (e.g., NFV) is utilized, a hypervisor 2022 may be executed to provide an execution environment for one or more network slices/sub-slices to utilize the hardware resources 2002.

The processors 2006 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2008 and a processor 2010.

The memory/storage devices 2014 may include main memory, disk storage, or any suitable combination thereof. The memory/storage devices 2014 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 2024 may include interconnection or network interface components or other suitable devices to communicate with one or more peripheral devices 2004 or one or more databases 2020 via a network 2018. For example, the communication resources 2024 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2012 may comprise software, a program, an application, an applet, an app, or other executable code for causing at least any of the processors 2006 to perform any one or more of the methodologies discussed herein. The instructions 2012 may reside, completely or partially, within at least one of the processors 2006 (e.g., within the processor's cache memory), the memory/storage devices 2014, or any suitable combination thereof. Furthermore, any portion of the instructions 2012 may be transferred to the hardware resources 2002 from any combination of the peripheral devices 2004 or the databases 2020. Accordingly, the memory of the processors 2006, the memory/storage devices 2014, the peripheral devices 2004, and the databases 2020 are examples of computer-readable and machine-readable media.

For one or more embodiments, at least one of the components set forth in one or more of the preceding figures may be configured to perform one or more operations, techniques, processes, and/or methods as described herein. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a parent integrated access and backhaul (IAB) node of a wireless communication system, comprising:
receiving, from a child IAB node, information comprising one or more of:
one or more number of hops metrics corresponding to one or more data flows received at the child IAB node;
one or more aggregate throughput per backhaul (BH) radio link control (RLC) channel identifier (ID) metrics or one or more aggregate throughput per routing ID metrics corresponding to the one or more data flows received at the child IAB node; and
one or more per-hop latency for aggregated traffic per BH RLC channel ID per IAB node metrics or one or more per-hop latency for aggregated traffic per routing ID per IAB node metrics corresponding to the one or more data flows received at the child IAB node;
calculating a fairness index using the received information, wherein the fairness index indicates a percentage of time duration that the child IAB node will prioritize packets of one of the one or more data flows received at the child IAB node;
determining a data flow prioritization configuration for the child IAB node based on the received information, wherein the data flow prioritization configuration comprises the fairness index;
and
sending, to the child IAB node, the data flow prioritization configuration.

2. The method of claim 1, wherein the data flow prioritization configuration is sent to the child IAB node in a BH adaptation header (BAP) protocol data unit (PDU).

3. The method of claim 1, wherein the data flow prioritization configuration is sent to the child IAB node on an F1 application protocol (F1AP) interface.

4. A method of a donor integrated access and backhaul (IAB) node of a wireless communication system, comprising:
receiving information regarding one or more data flows received at a descendent IAB node;
calculating a fairness index using the received information, wherein the fairness index indicates a percentage of time duration that the descendent IAB node will prioritize packets of one of the one or more data flows received at the descendent IAB node;
determining a data flow prioritization configuration for the descendent IAB node based on the received information, wherein the data flow prioritization configuration comprises the fairness index;
and
sending, to the descendent IAB node, the data flow prioritization configuration.

5. The method of claim 4, wherein the information regarding the one or more data flows received at the descendent IAB node is received from the descendent IAB node on an F1 application protocol (F1AP) interface.

6. The method of claim 4, wherein the information regarding the one or more data flows received at the descendent IAB node is received from a child node that is not the descendent TAB node in a BH adaptation header (BAP) protocol data unit (PDU).

7. The method of claim 4, wherein the information regarding the one or more data flows received at the descendent IAB node comprises:
one or more number of hops metrics corresponding to the one or more data flows received at the descendent IAB node; and
one or more aggregate throughput per backhaul (BH) radio link control (RLC) channel identifier (ID) metrics or one or more aggregate throughput per routing ID metrics corresponding to the one or more data flows received at the descendent IAB node.

8. The method of claim 4, wherein the information regarding the one or more data flows received at the descendent IAB node comprises one or more per-hop latency metrics corresponding to the one or more data flows; and further comprising determining a list of packets to drop at the descendent IAB node, wherein the data flow prioritization configuration comprises the list of packets to drop at the descendent IAB node.

9. The method of claim 8, wherein the one or more per-hop latency metrics corresponding to the one or more data flows is indicated per a BH radio link control (RLC) channel of each of the one or more data flows.

10. The method of claim 8, further comprising configuring the descendent IAB node to timestamp packets of the one or more data flows; wherein the received information regarding one or more data flows comprises timestamps of the packets of the one or more data flows.

11. A method of a child integrated access and backhaul (IAB) node of a wireless communication system, comprising:

calculating a plurality of metrics for one or more data flows received at the child IAB, the plurality of metrics including:
  one or more number of hops metrics for the one or more data flows;
  one or more aggregate throughput per backhaul (BH) radio link control (RLC) channel identifier (ID) metrics or one or more aggregate throughput per routing ID metrics for the one or more data flows; and
  one or more per-hop latency for aggregated traffic per BH RLC channel ID per IAB node metrics or one or more per-hop latency for aggregated traffic per routing ID per IAB node metrics for the one or more data flows;

sending one of the one or more metrics to a parent IAB node; and receiving, from the parent IAB node, a data flow prioritization configuration comprising a fairness index that indicates a percentage of time duration that the child IAB node will prioritize packets of one of the one or more data flows received at the child IAB node.

12. The method of claim 11, wherein the one of the plurality of metrics is sent to the parent IAB node in a BH adaptation header (BAP) protocol data unit (PDU).

13. The method of claim 11, wherein the one of the plurality of metrics is sent to the parent IAB node using an F1 application protocol (F1AP) interface.

14. The method of claim 11, wherein the one or more number of hops metrics are each calculated by incrementing a counter received at the child IAB node that corresponds to a data flow received at the child IAB node.

15. The method of claim 11, wherein the one or more aggregate throughput per BH RLC channel ID metrics or the one or more aggregate throughput per routing ID metrics for the one or more data flows are each calculated by dividing a number of RLC service data units (SDUs) by a number of corresponding acknowledgements received for the RLC SDUs.

16. The method of claim 11, wherein the one or more per-hop latency per BH RLC channel ID metrics are each calculated by referring to one of system frame numbers (SFNs) and subframe numbers received in each of the one or more data flows.

* * * * *